(12) United States Patent
Rossio et al.

(10) Patent No.: US 8,364,398 B2
(45) Date of Patent: Jan. 29, 2013

(54) METHOD OF OPERATING A NAVIGATION SYSTEM TO PROVIDE ROUTE GUIDANCE

(75) Inventors: Sara B. Rossio, Chicago, IL (US); Christopher S. Wiklund, Hillside, IL (US); Steven M. Harding, Decatur, GA (US); David J. Holsinger, Chicago, IL (US)

(73) Assignee: Navteq B.V., Veldhoven (NL)

( * ) Notice: Subject to any disclaimer, the term of this patent is extended or adjusted under 35 U.S.C. 154(b) by 352 days.

(21) Appl. No.: 12/769,050

(22) Filed: Apr. 28, 2010

(65) Prior Publication Data

US 2011/0054777 A1  Mar. 3, 2011

Related U.S. Application Data

(63) Continuation-in-part of application No. 12/549,604, filed on Aug. 28, 2009.

(51) Int. Cl.
*G01C 21/00* (2006.01)
*G08G 1/123* (2006.01)

(52) U.S. Cl. ........ 701/439; 701/400; 701/423; 701/445; 701/438; 340/988; 340/990; 340/995.24

(58) Field of Classification Search .......... 701/423, 701/445, 438, 439; 340/988, 990, 995.24
See application file for complete search history.

(56) References Cited

U.S. PATENT DOCUMENTS

| | | | | |
|---|---|---|---|---|
| 5,751,228 A * | 5/1998 | Kamiya et al. | ................ | 340/988 |
| 5,835,854 A | 11/1998 | Palisson et al. | ............ | 455/186.1 |
| 5,890,088 A | 3/1999 | Nimura et al. | ................ | 701/211 |
| 6,012,028 A | 1/2000 | Kubota et al. | ................ | 704/260 |
| 6,078,865 A | 6/2000 | Koyanagi | ...................... | 701/211 |
| 6,199,014 B1 | 3/2001 | Walker | ........... | 701/211 |
| 6,339,746 B1 * | 1/2002 | Sugiyama et al. | ........... | 701/416 |
| 6,477,460 B2 | 11/2002 | Kepler | ........... | 701/209 |
| 6,498,985 B1 | 12/2002 | Petzold | ........... | 701/211 |
| 6,594,581 B2 | 7/2003 | Matsuda et al. | ............. | 701/211 |
| 6,622,089 B2 | 9/2003 | Hasegawa et al. | ........... | 701/211 |
| 6,728,635 B2 | 4/2004 | Hamada et al. | ............... | 701/211 |
| 6,836,724 B2 | 12/2004 | Becker et al. | ............... | 701/200 |
| 7,149,626 B1 | 12/2006 | Devries et al. | ............... | 701/211 |
| 7,389,179 B2 | 6/2008 | Jin et al. | ........... | 701/207 |
| 7,421,341 B1 * | 9/2008 | Hopkins et al. | ............... | 701/533 |
| 7,541,945 B2 | 6/2009 | Nakashima | ............. | 340/995.24 |

(Continued)

FOREIGN PATENT DOCUMENTS

| | | |
|---|---|---|
| EP | 0837434 | 4/1998 |
| EP | 2196975 | 6/2010 |

(Continued)

OTHER PUBLICATIONS

European Search Report, dated Jan. 18, 2011, European Appln. 10251267.0-1236.

(Continued)

*Primary Examiner* — Thomas Tarcza
*Assistant Examiner* — Adam Tissot

(57) ABSTRACT

A method of operating a navigation system to provide a route guidance message for traveling a route is disclosed. A plurality of features visible from a road segment of the route is obtained from a geographic database associated with the navigation system. An importance rating for each of the identified features is determined. The guidance message references the identified feature having a highest determined importance rating. The importance rating considers a permanence or a seasonal dependency of the identified feature. The importance rating is adjusted to favor the identified feature closest to the lane in which the vehicle is currently located.

19 Claims, 13 Drawing Sheets

U.S. PATENT DOCUMENTS

| | | | |
|---|---|---|---|
| 2002/0009978 A1 | 1/2002 | Dukach et al. | 455/99 |
| 2007/0078596 A1 | 4/2007 | Grace | 701/209 |
| 2007/0143345 A1 | 6/2007 | Jones et al. | 707/104.1 |
| 2007/0299607 A1 | 12/2007 | Cubillo | 701/211 |
| 2008/0262717 A1 | 10/2008 | Ettinger | 701/206 |
| 2008/0319659 A1 | 12/2008 | Horvitz et al. | 701/211 |
| 2009/0005959 A1 | 1/2009 | Bargman et al. | 701/117 |
| 2009/0276318 A1 | 11/2009 | Broadbent et al. | 705/14.64 |
| 2009/0281728 A1 | 11/2009 | Mishra et al. | 701/210 |
| 2010/0223003 A1 | 9/2010 | Harada | 701/201 |

FOREIGN PATENT DOCUMENTS

| | | |
|---|---|---|
| JP | 2006275721 | 12/2006 |
| JP | 2009-186372 | 8/2009 |

OTHER PUBLICATIONS

European Search Report, dated Dec. 6, 2010, European Appln. No. 10251162.3-1236.

European Search Report, dated Dec. 6, 2010, European Appln. No. 10006808.9-1236.

* cited by examiner

| Attribute | Values | Score | Weight |
|---|---|---|---|
| Visibility | 1 – The POI is clearly visible<br>2 – The POI is partly visible<br>3 – Not visible, but relevant | 2<br>1<br>0 | 1 |
| Permanence | 1 – Permanence is Low (chg within 1 year)<br>2 – Permanence is Medium (changes 1-3)<br>3 – Permanence is High (changes 3+) | 0<br>1<br>2 | 1 |
| (Relative) Distance | 1 - Close to the guidance point<br>2 - On distance from guidance point. | 1<br>0 | 1 |
| Feature Extent | 1-Feature Extent Length <25m<br>2- Feature Extent Length 26m-50m<br>3- Feature Extent Length 51-75m<br>4- Feature Extent Length >76m | 0<br>1<br>2<br>3 | 1 |
| Seasonal Dependency | 1 – No<br>2 – Yes | 0<br>-2 | 1 |
| Preferred Name | 1 – Default name<br>2 – Special name | 0<br>2 | 1 |
| Calculated Importance | SUM of the above values =<10 | | |

FIG. 7

METHOD OF OPERATING A NAVIGATION SYSTEM TO PROVIDE ROUTE GUIDANCE

REFERENCE TO RELATED APPLICATIONS

This application is a continuation-in-part of application Ser. No. 12/549,604 filed Aug. 28, 2009.

BACKGROUND OF THE INVENTION

The present invention relates to a method and system for operating a navigation system, and more particularly to a method and system for providing route guidance using contextual elements along a calculated route from an origin location to a destination location.

Navigation systems are available that provide end users with various navigation-related functions and features. For example, some navigation systems are able to determine an optimum route to travel along a road network from an origin location to a destination location in a geographic region. Using input from the end user, the navigation system can examine various potential routes between the origin and destination locations to determine the optimum route. The navigation system may then provide the end user with information about the optimum route in the form of guidance that identifies the maneuvers required to be taken by the end user to travel from the origin to the destination location. Some navigation systems are able to show detailed maps on displays outlining the route, the types of maneuvers to be taken at various locations along the route, locations of certain types of features, and so on.

In order to provide these and other navigation-related functions and features, navigation systems use geographic data. The geographic data may be in the form of one or more geographic databases that include data representing physical features in the geographic region. The geographic database includes information about the represented geographic features, such as one-way streets, position of the roads, speed limits along portions of roads, address ranges along the road portions, turn restrictions at intersections of roads, direction restrictions, such as one-way streets, and so on. Additionally, the geographic data may include points of interests, such as businesses, facilities, restaurants, hotels, airports, gas stations, stadiums, police stations, and so on.

Although navigation systems provide many important features, there continues to be room for new features and improvements. One area in which there is room for improvement relates to providing guidance to follow a route. Typically, route guidance identifies maneuvers to be taken at specified locations, such as turn left at next intersection. Some end users may get confused as to their orientation and where to turn. Accordingly, it would be beneficial to provide improved guidance to follow a route. More particularly, it would be beneficial to consider details in the end user's environment and context to provide a more natural, environmental and intuitive guidance message.

SUMMARY OF THE INVENTION

To address these and other objectives, the present invention comprises a method for operating a navigation system to provide a guidance message for traveling a route comprising at least one road segment. The method obtains data from a geographic database associated with the navigation system identifying a plurality of features visible from the road segment. The method also identifies a lane of the road segment in which the vehicle is currently located. An importance rating for each of the identified features is determined by considering a permanence of the identified feature or a seasonal dependency of the identified feature. The permanence of the identified feature indicates whether a visible appearance of the identified feature is constant. The seasonal dependency of the identified feature indicates whether the visible appearance of the identified feature is impacted by a season. The importance rating for each of the identified features is adjusted to favor the identified feature closest to the lane in which the vehicle is currently located. The identified feature having a highest determined importance rating is referenced by the guidance message. The importance rating may further consider a visibility attribute of the identified feature that indicates a level of visibility obstruction of the identified feature. The importance rating may also consider whether a name describing a visually distinguishing aspect of the identified feature is available from the geographic database.

According to another aspect, the present invention comprises a navigation system. The navigation system comprises a processor, a geographic database associated with the processor, and a guidance application program executed on the processor to provide a guidance message for traveling a route comprising at least one road segment. The guidance application program determines a direction of an upcoming maneuver and obtains data from the geographic database identifying a plurality of features visible from the road segment. The guidance application program determines an importance rating for each of the identified features and provides the guidance message referencing the identified feature having a highest determined importance rating. The importance rating favors the identified feature located on a same side of the road segment as the direction of the upcoming maneuver. The importance rating considers at least one attribute of the identified feature selected from a group consisting of a permanence attribute representing whether a visible appearance of the identified feature is constant, a seasonal dependency attribute representing whether the visible appearance is impacted by a season, a visibility attribute representing a level of visibility obstruction, a prominence attribute representing a prominence of the identified feature considering both a size of the identified feature and a distance of the identified feature from the road segment, a feature extent attribute representing a length of the identified feature, and a preferred name attribute representing whether a name describing a visually distinguishing aspect of the identified feature is available from the geographic database.

BRIEF DESCRIPTION OF THE DRAWINGS

An exemplary embodiment of the present invention is described herein with reference to the following drawings.

FIG. 7 is a table illustrating importance attributes for a feature in the geographic region.

DETAILED DESCRIPTION OF THE PRESENTLY PREFERRED EMBODIMENTS

I. Navigation System

Figure 1:
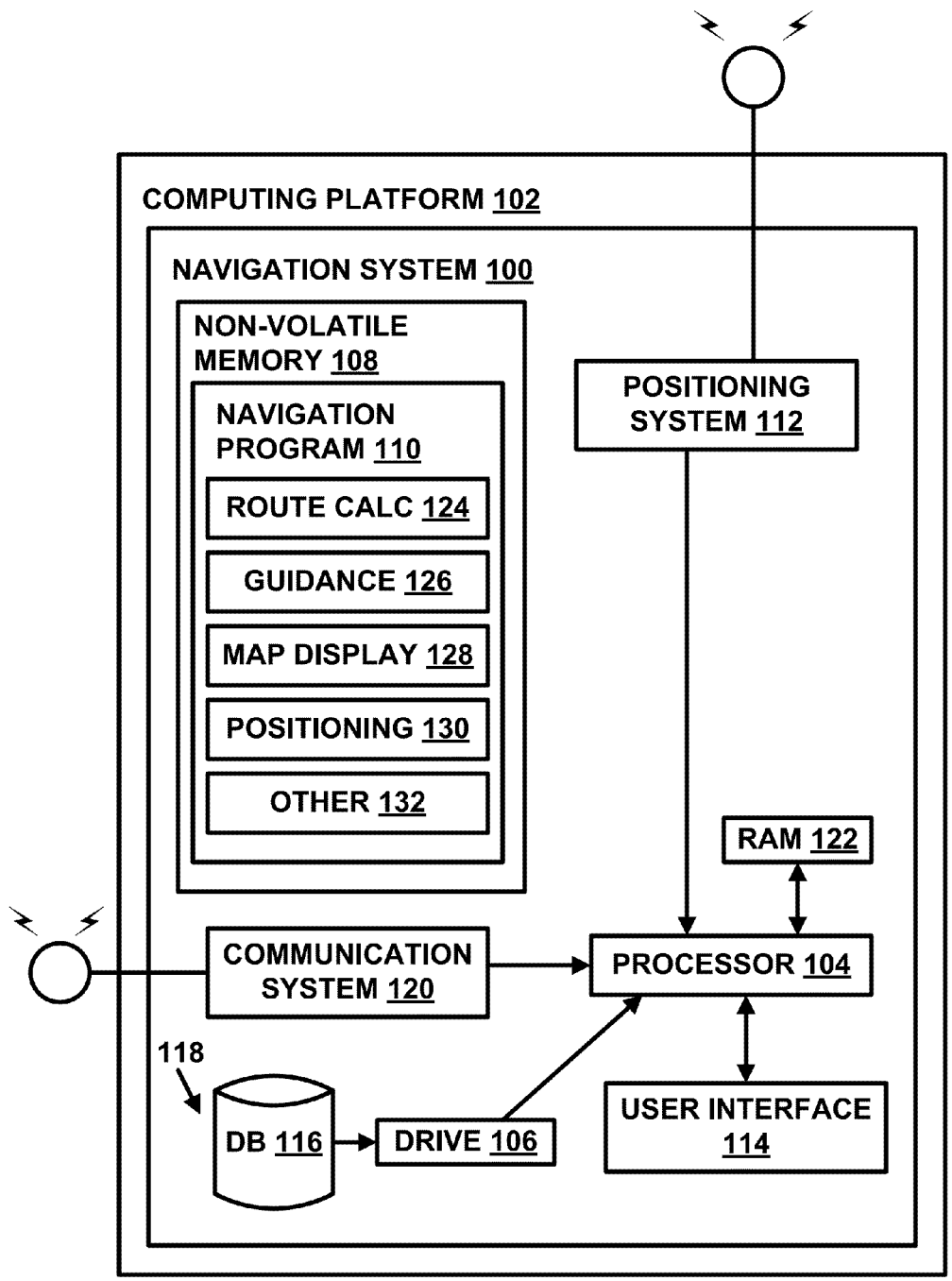
FIG. 1 is a block diagram of a navigation system, according to an exemplary embodiment.

FIG. 1 is a block diagram of a navigation system 100 associated with a computing platform 102, such as an in-vehicle navigation device, a personal navigation device, a mobile computer, mobile telephone, personal digital assistant (PDA), personal computer, or any other computer, according to an exemplary embodiment. The navigation system 100 is a combination of hardware and software components. In one embodiment, the navigation system 100 includes a processor 104, a drive 106 connected to the processor 104, and a non-volatile memory storage device 108 for storing navigation application software programs 110 and possibly other information.

The navigation system 100 also includes a positioning system 112. The positioning system 112 may utilize GPS-type technology, a dead reckoning-type system, or combinations of these or other systems, all of which are known in the art. The positioning system 112 may include suitable sensing devices that measure the traveling distance speed, direction, orientation and so on. The positioning system 112 may also include a GPS system. The positioning system 112 outputs a signal to the processor 104. The navigation application software programs 110 that run on the processor 104 use the signal from the positioning system 112 to determine the location, direction, orientation, etc., of the computing platform 102.

The navigation system 100 also includes a user interface 114 that allows the end user to input information into the navigation system 100 and obtain information from the navigation system 100. The input information may include a request for navigation features and functions of the navigation system 100. To provide navigation features and functions, the navigation system 100 uses a geographic database 116 stored on a computer readable storage medium 118. In one embodiment, the storage medium 118 is installed in the drive 106 so that the geographic database 116 can be read and used by the navigation system 100. In one embodiment, the geographic database 116 may be a geographic database published by NAVTEQ North America, LLC of Chicago, Ill. The storage medium 118 and the geographic database 116 do not have to be physically provided at the location of the navigation system 100. In alternative embodiments, the storage medium 118, upon which some or the entire geographic database 116 is stored, may be located remotely from the rest of the navigation system 100 and portions of the geographic data provided via a communications system 120, as needed.

In one exemplary type of system, the navigation application software programs 110 load from the non-volatile memory storage device 108 into a random access memory (RAM) 122 associated with the processor 104. The processor 104 also receives input from the user interface 114. The navigation system 100 uses the geographic database 116 stored on the storage medium 118, possibly in conjunction with the outputs from the positioning system 112 and the communications system 120, to provide various navigation features and functions. The navigation application software programs 110 may include separate applications (or subprograms) that provide the various navigation-related features and functions. The navigation functions and features may include route calculation 124 (wherein a route from an origin to a destination is determined), route guidance 126 (wherein detailed directions are provided for reaching a desired destination), map display 128 (wherein a map depicting the current position and route to travel are shown on a display), and positioning 130 (e.g., map matching). Other functions and programming 132 may be included in the navigation system 100 including people and business finding services (e.g., electronic yellow and white pages), point of interest searching, destination selection, and location base advertising services.

The navigation application software programs 110 may be written in a suitable computer programming language such as C, although other programming languages, such as C++ or Java, are also suitable. All of the components described above may be conventional (or other than conventional) and the manufacture and use of these components are known to those of skill in the art.

In alternative embodiments, the navigation system 100 includes local components, located physically with an end user, that communicate with remote components, located remotely from the end user. In this embodiment, the remote components include a navigation services server. The navigation application software programs 110 and the geographic database 116 reside with the navigation server. The local components of the navigation system communicate with the remote components via a communication link. The communication link may use any suitable technology and/or protocols that are currently available, as well as technology and/or protocols that become available in the future. A portion of the communications link may include a wireless portion that enables two-way communication between the local components and the remote components. The wireless portion may be implemented by any suitable form of wireless communication, including cellular, PCS, satellite, FM, radio, Bluetooth®, other long and short range transmission technologies or technologies that may be developed in the future.

II. Geographic Database

Figure 2:
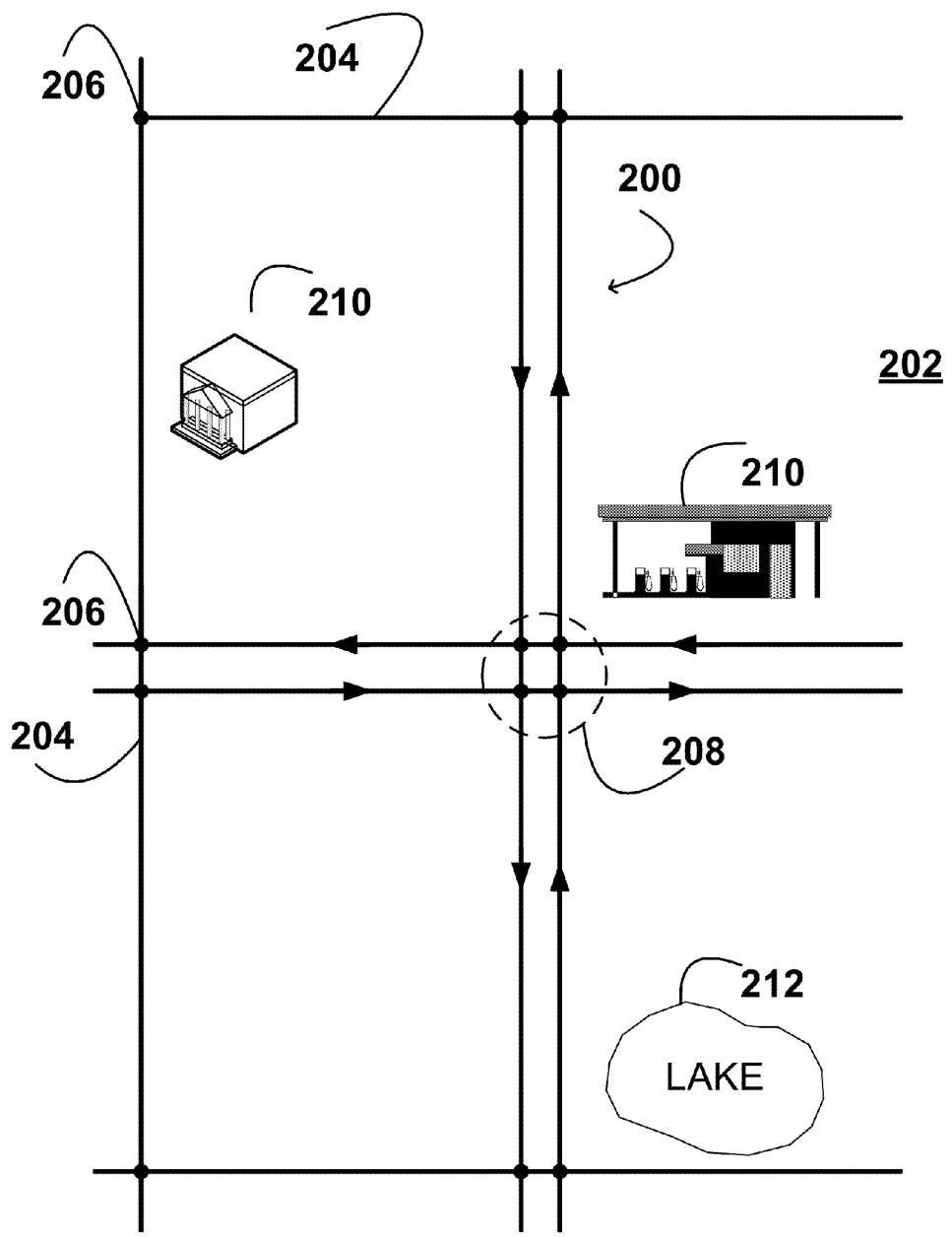
FIG. 2 shows a map of a geographic region.

In order to provide navigation-related features and functions to the end user, the navigation system 100 uses the geographic database 116. The geographic database 116 includes information about one or more geographic regions. FIG. 2 illustrates a map 200 of a portion of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc.

The map 200 illustrates part of a road network in the geographic region 202. The road network includes, among other things, roads and intersections located in the geographic region 202. Each road in the geographic region 202 is composed of one or more road segments 204. A road segment 204 represents a portion of the road. Each road segment 204 is shown to have associated with it two nodes 206; one node represents the point at one end of the road segment and the other node represents the point at the other end of the road segment. The node 206 at either end of a road segment 204 may correspond to a location at which the road meets another road, i.e., an intersection, or where the road dead-ends. The road segments 204 may include sidewalks and crosswalks for travel by pedestrians.

As shown in FIG. 2, the geographic region 202 also includes complex features 208, such as a complex intersection that comprises multiple road segments and multiple nodes. The geographic region further includes points of interest 208, such as businesses, facilities, restaurants, hotels, gas stations, stadiums, police stations, and so on. The geographic region 202 further includes other cartographic features 210, such as lakes, forests, rivers, hills, mountains and so on.

Figure 3:
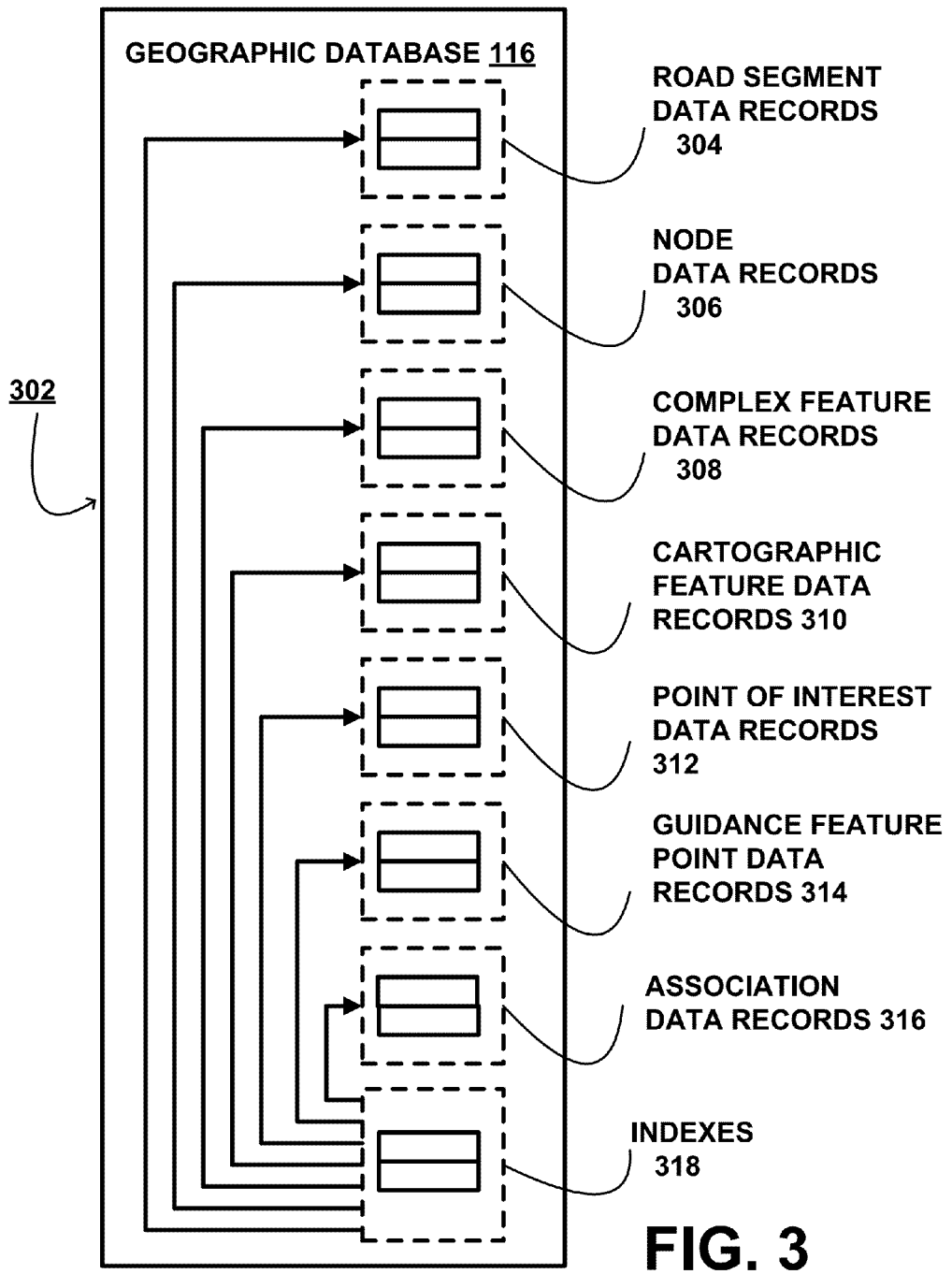
FIG. 3 is a block diagram of a geographic database that represents the geographic region included in the navigation system depicted in FIG. 1

Referring to FIG. 3, the geographic database 116 contains data 302 that represents some of the physical geographic features in the geographic region 202 depicted in FIG. 2. The data 302 contained in the geographic database 116 includes data that represent the road network for travel by vehicles and the pedestrian network for travel by pedestrians. In the embodiment of FIG. 3, the geographic database 116 that represents the geographic region 202 contains at least one road segment data record 304 (database record may also be referred to as "entity" or "entry") for each road segment 204 in the geographic region 202. The geographic database 116 that represents the geographic region 202 also includes a node data record 306 for each node 212 in the geographic region 202. The terms "nodes" and "segments" and "links" represent only one terminology for describing these physical geographic features, and other terminology for describing these features is intended to be encompassed within the scope of these concepts.

The geographic database 116 also contains complex feature data records 306 that represent complex features, such as complex intersections or grouped features that contain multiple road segments and nodes. The geographic database 116 further contains cartographic feature data records 310 that represent cartographic features, such as lakes, rivers, railroads, airports, parks, woodland and so on. The geographic database 116 also contains point of interest data records 312 that represent points of interest, such as businesses, facilities, restaurants, hotels, gas stations, stadiums, police stations, and so on. The point of interest data may include point of interest records comprising a type of point of interest, location of the point of interest, a phone number, hours of operation, etc.

Moreover, the geographic database 116 contains guidance feature point object data records 314 and association data records 316 that will be described in detail below. The geographic database 116 may also include other kinds of data. The other kinds of data 312 may represent other kinds of geographic features or anything else. The geographic database 116 also includes indexes 318. The indexes 318 may include various types of indexes that relate the different types of data to each other or that relate to other aspects of the data contained in the geographic database 116. For example, the indexes 318 may relate the nodes in the node data records 306 with the end points of a road segment in the road segment data records 304. As another example, the indexes 314 may relate point of interest data in the point of interest data records 312 with a road segment in the road segment data records 304.

Figure 4:
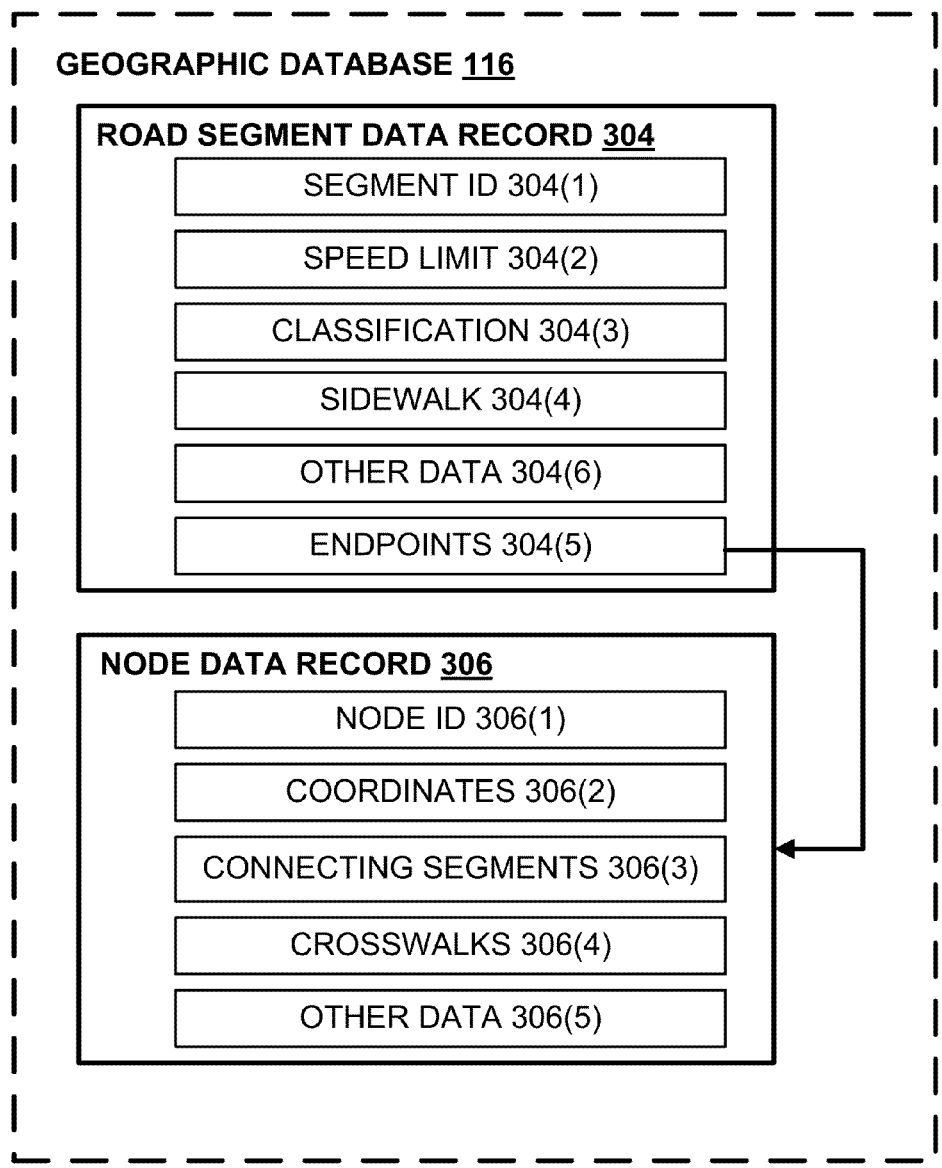
FIG. 4 is a block diagram of components of data records contained in the geographic database depicted in FIG. 3.

FIG. 4 shows some of the components of a road segment data record 304 contained in the geographic database 116. The road segment data record 304 includes a segment ID 304(1) by which the data record can be identified in the geographic database 116. Each road segment data record 304 has associated with it information (such as "attributes", "fields", etc.) that describes features of the represented road segment. The road segment data record 304 may include data 304(2) that indicate a speed limit or speed category (i.e., the maximum permitted vehicular speed of travel) on the represented road segment. The road segment data record 304 may also include data 304(3) that indicate a classification such as a rank of a road segment that may correspond to its functional class.

The road segment data record also includes data 304(4) that indicate whether a sidewalk is associated with the road segment as well as attributes information for the sidewalk. The road segment data record 304 may also include or be associated with other data 304(6) that refer to various other attributes of the represented road segment. The various attributes associated with a road segment may be included in a single road segment record, or may be included in more than one type of record which cross-references to each other. For example, the road segment data record 304 may include data identifying what turn restrictions exist at each of the nodes which correspond to intersections at the ends of the road portion represented by the road segment, the name or names by which the represented road segment is known, the length of the road segment, the grade of the road segment, the number of lanes of the road segment including designated turn lanes, the street address ranges along the represented road segment, the permitted direction of vehicular travel on the represented road segment, whether the represented road segment is part of a controlled access road (such as an expressway), a ramp to a controlled access road, a bridge, a tunnel, a toll road, a ferry, and so on.

The road segment data record 304 also includes data 304(6) identifying the endpoints of the road segment and the location (e.g., the latitude and longitude) of the endpoints. In one embodiment, the endpoint data 304(6) references node data records 306 defined for the nodes corresponding to the endpoints of the represented road segment. By convention, each road segment is considered to have a "reference" or "left: endpoint and a "non-reference" or "right" endpoint. The left endpoint may be the node having greater longitudinal coordinates, or in the case in which the longitudinal coordinates are the same, the node having the lesser latitude. Of course, which node is defined as the left or right endpoints can be alternatively defined.

Each node data record 306 includes a node ID 306(1) by which the record can be identified in the geographic database 116. The node data record 306 also includes data 306(2) data identifying the geographic coordinates (e.g., the latitude, longitude, and optionally altitude) of the represented node. The node data record 306 also includes data 306(3) identifying road segments that connect to the node to form an intersection. For example, a node identified by a node ID 306(1) may represent an intersection of two roads. At the intersection, each of the two roads may be represented by two road segments (located on opposite sides of the center of the intersection) each having an endpoint at the node. In this example of a standard four-way intersection, the connecting segment data 306(3) includes four segments IDs 304(1) identifying the four road segments that connect to the node to form the intersection.

The node data record 204 also include data 306(4) that indicate whether a crosswalk is present as well as attributes information for the crosswalk. The node data record 306 may also include other data 306(5) that refer to various other attributes of the nodes.

III. Collecting Data for Guidance Feature Points and Association Information

It is desired to provide support for end user to get route guidance instructions based on contextual elements surrounding the road segment. Such enhanced guidance is referred to as natural guidance, and natural guidance is defined as a turn-by-turn experience encompassing multiple attributes and relations which details the user's environment and context to more natural, environmental and intuitive triggers. Guidance messages formed using natural guidance provide details of contextual elements surrounding decision points such as points of interest, cartographic features and traffic signals and/or stop signs. An example of a guidance message using natural guidance is "go past the dome building on your right, then turn right after the petrol station."

To allow the navigation system 100 to provide natural guidance information, a geographic database developer collects information relating to the geographic features of the geographic region useful for providing guidance instructions that are more natural, provide additional environmental context and are more intuitive. In one embodiment, a geographic researcher travels the geographic region to collect information relating to geographic features. As the geographic research travels the geographic region, images and/or video of the road network and the area surrounding the road are collected and stored on a storage medium. In addition to collecting images or video of the road network and the surrounding area, a Light Detection and Ranging ("LIDAR") device or sensor may be used to collect data by transmitting and receiving light ("LIDAR data"). In one embodiment, the LIDAR device collects and gathers data points in a point cloud, such as a 3D point cloud, in which each data point corresponds to a local coordinate, such as (x, y, z). The 3D point cloud may be analyzed to identify road furniture, such as road signs, traffic lights and street lights, features of buildings and trees along the road side. The geographic research collects information directly when traveling in the geographic region and/or collects information after traveling in the geographic region by later examining the video, images and LIDAR data. In another embodiment, the geographic researcher uses aerial images to collect information.

Figure 5:
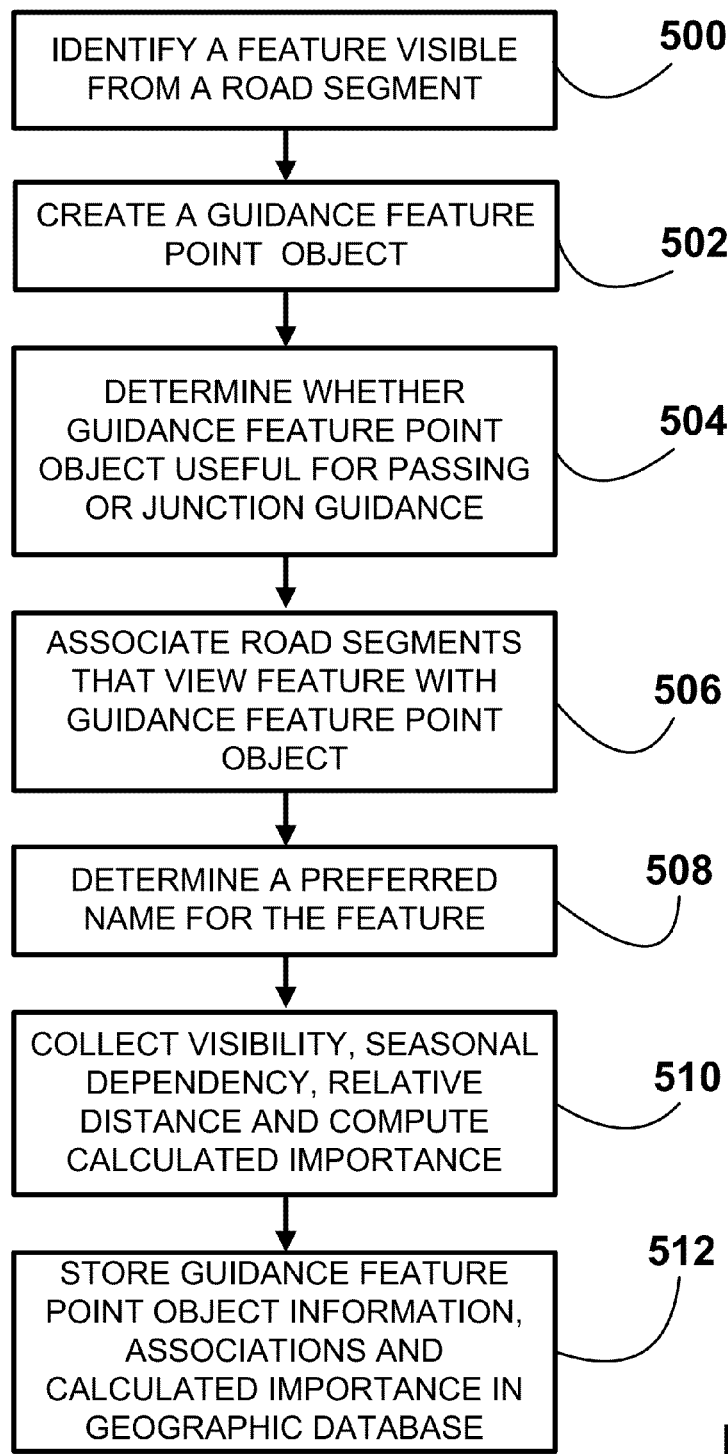
FIG. 5 is a flow chart for collecting environmental context information useful for guidance instructions.

FIG. 5 illustrates a flow chart of the steps for collecting environmental context information useful for natural guidance. The geographic researcher uses a computer work station, comprising a user interface, a display, a processor and a computer readable storage, medium to carry out the steps of this flow chart. Although the steps for collecting environmental context information useful for natural guidance are described in terms of road segments, similar steps may be used to collect environmental context information useful for pedestrians. Additionally, may road segments include sidewalks for travel by pedestrian, so environmental context information collected for the road segment may be readily applied to the associated sidewalk for use by pedestrians.

In one embodiment, the geographic researcher collects environmental context information useful for natural guidance by visual inspection of images, video or LIDAR data. In another embodiment, an automatic process extracts the features visible in images and video and present in the LIDAR data. The automatic process is tailored to extract the most prominent feature from the surroundings based on differential color, differential size, distance from the road and so on. The automatic process may further identify the color, texture, building material or other aspects of the feature. Furthermore, the geographic researcher may use probe data representing prior travel along the road network by vehicles.

In a further embodiment, local knowledge and recommendations from local experts are used to identify environmental context information. For example, a community of navigation system users or local residents may recommend information that is useful for natural guidance. The geographic researcher may invite local residents or navigation system users to identify an appropriate guidance feature at a specified intersection. The geographic researcher evaluates the submissions from local residents or navigation users and performs the steps discussed below using information submitted by the navigation system users or local residents. Furthermore, the geographic researcher may enlist local residents or navigation system users to validate or review information identified in the automatic processing of the images, video and LIDAR data.

Figure 6A:
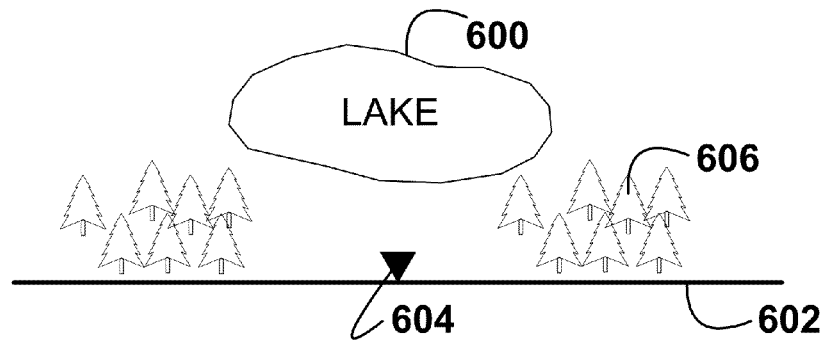
FIGS. 6a and 6b are representations of portions of the geographic region.
Figure 6B:
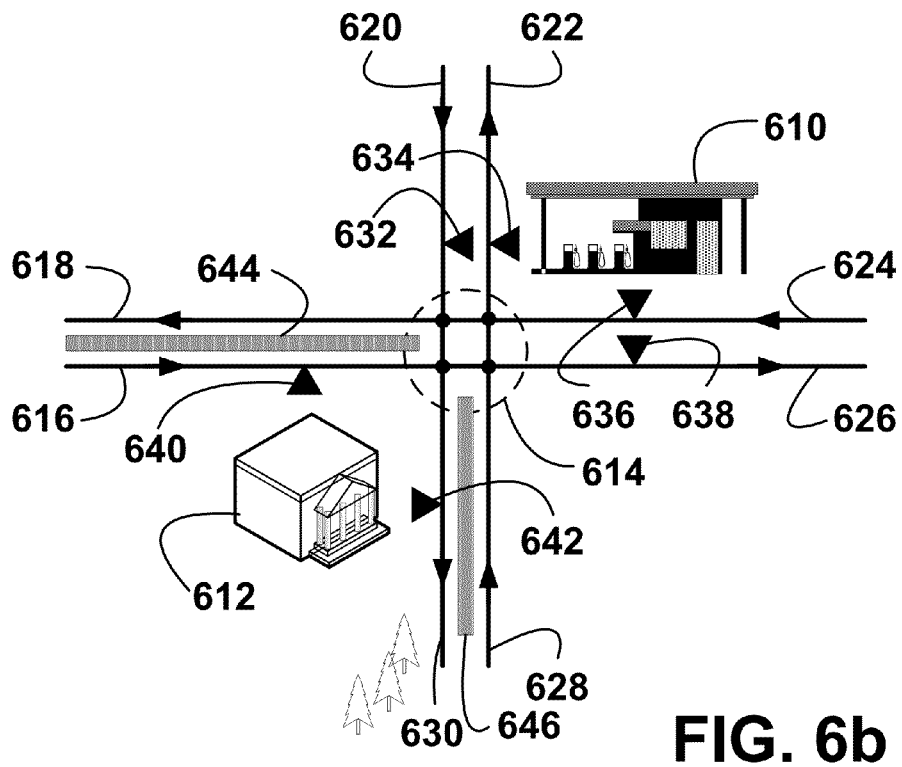

At step 500, the geographic research identifies a feature visible from a road segment. In one embodiment, the geographic researcher displays video of the road segment including portions of the geographic region at either side of the road segment on the work station. The feature may be a point of interest, such as a building, and or a cartographic feature, such as a lake. FIG. 6a illustrates a cartographic feature of a lake 600 visible from the road segment 602. FIG. 6b illustrates points of interest of a gas station 610 and a government building 612 proximate a complex intersection 614 visible from the road segments. The geographic researcher may identify every feature visible on the road segment or a subset thereof including prominent visible features.

At step 502 of FIG. 5, the geographic researcher creates a guidance feature point object for the identified feature visible from the road segment. A guidance feature point object represents a visible feature at or of a point on a road segment. The guidance feature point object is created at a location where the feature is most visibly prominent or most visibly identifiable or recognizable for the purpose of providing guidance advice referencing the visible feature. When the guidance feature point object is created, the geographic researcher records the latitude and longitude (and altitude) position information for the guidance feature object point and indicates on which side of the road segment that the visible feature is located. In one embodiment, because the guidance feature point object is located at the road segment from which the feature is most visibly prominent, the guidance feature point object is not located at an access point, drive way, or entrance point of the feature and the guidance feature point object is not located at a address point location of the feature.

Referring to FIG. 6a, a guidance feature point object 604 is located on the road segment 602 at a location where the lake 600 is most visible from the road segment 602. As shown in FIG. 6a, trees 606 obstruct the view of the lake 600 at several points along the road segment 602; therefore, the guidance feature point object 604 is located away from the trees 606 to provide a clear view to the lake 600 from the road segment 602. In one embodiment, the feature, such as the lake 600, should be visible from 25 meters or more on either side of the guidance feature point object 604. In other embodiments, different distances from either side of the guidance feature point object are possible, and the speed limit associated with the road segment may be considered when selecting such distances. Furthermore, if the visible feature is to be used for pedestrian guidance, the distances on either side of the guidance feature point object may be reduced because of the slow travel speed of a pedestrian.

Referring to FIG. 6b, the gas station 610 is proximate to the complex intersection 614 and road segments 620, 622, 624 and 626. The geographic researcher creates guidance feature point objects 632 and 634 at the road segments 620 and 622 respectively at locations where the gas station 610 is most visible without or with limited obstruction from the road segments 620 and 622. The geographic researcher also creates a guidance feature point objects 636 and 638 at the road segments 624 and 626 respectively at locations where the gas station 610 is most visible without or with limited obstruction from the road segments 624 and 626.

Referring to FIG. 6b, the government building 612 is proximate to the complex intersection 614 and road segments 616, 618, 628 and 630. The geographic researcher creates a guidance feature point objects 640 at the road segment 616 at a location where the government building is most visible without or with limited obstruction from the road segment 616. The geographic researcher also creates a guidance feature point object 642 at the road segment 630 at a location where the government building 612 is most visible without obstruction or with limited obstruction from the road segment 630. Note that the government building 612 is not visible from road segments 618 and 628 because high fences 644 and 646 obstruct the view of the government building 612 from those road segments. Accordingly, the geographic researcher does not create guidance feature point objects at or on the road segments 618 and 628 corresponding to the government building 612.

In another embodiment, the geographic researcher identifies road features, such as road curves or hills, that are readily observable to the driver, and the researcher creates a guidance feature point object for the curve or hill. The guidance feature point object for a hill may be created at the beginning of the hill, at the top of the hill or at the bottom of the hill. Similarly, the guidance feature point object for a curve may be created prior to the curve, at a location within the curve or after the curve.

At step 504, the geographic researcher determines whether the created guidance feature point object is useful to provide passing guidance or junction guidance. Passing guidance supports route guidance when passing a feature; junction guidance supports route guidance when driving (or turning) over a junction and/or complex intersection. Referring to FIG. 6a, the guidance feature point object 604 may be used to provide passing guidance because it provides a clear view of the lake 600 when passing by the lake 600 on the road segment 602. Referring to FIG. 6b, the guidance feature point objects 632, 634, 636, 638, 640 and 644 may be used to provide junction guidance because they are proximate and viewable when traveling through or turning at the complex intersection 614.

At step 506, the geographic researcher associates the road segments that have an unobstructed or limited view of the feature with the created guidance feature point object and thus associated to the feature. When determining which road segments to associate with the guidance feature point object, the geographic researcher ensures that it is possible to drive from that road segment (to be associated) onto the road segment at which the guidance feature point object is located. For the guidance feature point object useful for passing guidance, the road segment is associated with the guidance feature point object located at or on the road segment. For the guidance feature point object 604 shown in FIG. 6a that is useful for passing guidance, the road segment 602 is associated with the guidance feature point object 604 and thus associated with the cartographic feature of the lake 600.

FIG. 6b illustrates how road segments are associated with guidance feature point objects useful for junction guidance. The gas station 610 is visible from road segments 618, 620, 622, 624, 626 and 628. Road segment 620 is associated with guidance feature point object 632, road segment 622 is associated with guidance feature point object 634, road segment 624 is associated with guidance feature point object 636, and road segment 626 is associated with guidance feature point object 638 because these respective guidance feature point objects are located at or on these respective road segments. As for one of the road segments that do not have a guidance feature point object located at or on the road segment, the road segment from which the feature is visible is associated with the guidance feature point object that is located on one of the road segments of the junction that can be driven to from the other road segment. For road segment 628, the gas station 610 is visible and a vehicle may drive from road segment 628 onto road segment 626. Accordingly, road segment 628 is associated with the guidance feature point object 638 located on road segment 626. The gas station 610 is not visible from road segments 616 because a high fence 644 obstructs the view of the gas station 610 from road segment 616. Also, the gas station 610 is not visible from road segments 630 because a high fence 646 obstructs the view of the gas station 610 from road segment 630. Thus, road segments 616 and 630 are not associated with guidance feature object points related to the gas station 610.

Referring to FIG. 6b, the government building 612 is visible from road segments 616 and 630, and the high fences 644 and 646 obstruct the view of the government building 612 from road segments 618, 620, 622, 624, 626 and 628. The road segment 616 is associated with guidance feature point object 640; the road segment 630 is associated with guidance feature point object 642.

At step 508, the geographic researcher determines a preferred name for the feature and associates the preferred name with the respective guidance feature point object(s) related to that feature. The preferred name describes a visible characteristic or a visually distinguishing aspect of the feature, such as the color of the feature, shape of the feature, age of the feature, building materials of the feature, style of the feature, architectural description, decorative features, other visual properties including luster and sheen (shiny or dull) of the feature, motion or perceived motion of a portion of the feature, and/or any visible attribute that distinguishes the feature from other features in the surrounding area. For example, the special name may be pink building, dome-shaped building, glass building, brick building, gothic architecture building, windowless building, tall building, neon sign of a bird attached to building, fountain in front of building, sculpture in front of building, and so on. Furthermore, the preferred name may include various adjectives to describe the feature, such as grand old courthouse. In one embodiment, the preferred name may be a locally know name or nickname for the feature, such as "Max Brothers Petrol Shop." In addition to determining a preferred name for the feature, a base name is determined, such as gas station for the gas station 612. In a further embodiment, the brand name of the gas station may be determined. In another embodiment, different preferred names may be collected for different end users. For example, one preferred name may be collected for female end users and another preferred name for male end users; one preferred name may be collected for local end users and another preferred name for tourists or end users that do not reside is the geographic region.

At step 510, the geographic research collects information regarding the visibility, seasonal dependency, relative distance of the feature and computes a calculated importance for the feature. The visibility, seasonal dependency and relative distance attribute information along with the calculated importance value are associated with the respective guidance feature point object(s) of the feature. The visibility attribute defines how visible or how obscured the feature is when traveling the road segment. The visibility attribute is assigned one of the visibility values that indicate a level of visibility (or level of visual obstruction), such as 1 for clearly visible, 2 for partially visible and 3 for not visible. Partial visibility may occur because of obstructions such as signs, trees, surrounding building, and so on.

For the example shown in FIG. 6a, the lake 600 for guidance feature point object 604 is assigned a visibility value of 2 for partially visible because trees 606 obscure the view of the lake 600 for a portion of the road segment 602. For the example shown in FIG. 6b, the gas station 610 is assigned visibility value of 1 for clearly visible from road segments 620, 622, 624, 626 and 628. In alternative embodiments, different visibility values may be used. For example, the level of visibility may be selected based on the percentage of the road segment that the feature is visible.

In one embodiment, the geographic researcher collects information regarding the visibility of the feature at different times of the day. For example, the geographic researcher identifies the lake 600 of FIG. 6a as highly visible during daylight hours but not visible during non-daylight hours. Additionally, the geographic researcher identifies the gas station 610 of FIG. 6b as highly visible during daylight hours and non-daylight hours because the gas station is associated with significant street lighting, lighted signage and business hours of 24 hours a day. Additionally, the geographic researcher collects information indicating how the visibility of the feature changes during different weather conditions, such as rain, snow, fog and so on. For example, the geographic researcher identifies the lake 600 as being barely visible during rain, snow and fog weather conditions. Additionally, the geographic researcher identifies the gas station 610 as being highly visible during all weather events because the gas station is associated with significant street lighting, and lighted signage.

Additionally, the geographic researcher collects information representing how the visibility of the feature changes during different traffic conditions, such as rush hour and off peak traffic times. During rush hour or during times with many delivery trucks, some features may be partially obscured by other vehicles traveling on the road. Moreover, the geographic researcher collects information representing the visibility of the feature for different end users, such as such as trucks, passenger cars, motorcycles, bicycles, pedestrians. In one embodiment, the level of visibility is adjusted depending on how lighting, traffic, weather or different end user affects the visibility of the feature. Alternatively, the geographic researcher may define different levels of visibility for different times of the day, different traffic conditions, different weather conditions and different end users.

The seasonal dependency attribute indicates whether the feature is impacted during a specific time period. In one embodiment, the geographic researcher indicates yes or no as to whether a seasonal dependency exists and records the season or time period during which the feature is impacted. For example, the lake 600 of FIG. 6a freezes during the winter and may be covered with snow rendering it unrecognizable, so the researcher indicates a yes for seasonal dependency for the lake 600 during the winter. Additionally, a swimming pool would be difficult to recognize during non-summer months because it is closed, so the swimming pool would also be classified as a yes for seasonal dependency during the non-summer months. Furthermore, in the summer the visibility of a building may be less due to trees and flowers.

The relative distance attribute indicates a perceived distance between the feature and the guidance feature point object location considering factors of the local situation, visibility and size of the feature. The relative distance provides a prominence of the feature, such as how prominent the feature is in its surroundings. In one embodiment, a value of 1 is assigned for features relatively close to the guidance feature point object location, and a value of 2 is assigned for features relatively distant to the guidance feature point object location.

For example, a large Cathedral located 100 meters from the guidance feature point object location is considered relatively close; a small café located 20 meters from the guidance feature point object location is considered relatively distant; and a large lake located 100 meters from the guidance feature point object location is considered relatively close.

The geographic researcher may also identify and record a permanence rating for the feature indicating whether the appearance or visibility of the feature will change or is constant. In one embodiment, a value of 1 is assigned for features with low permanence that are expected to change within one year, a value of 2 is assigned for features with medium permanence that are expected to change between one year and three years, a value of 3 is assigned for features with high permanence that are not expected to change within three years or more. For example, a large Cathedral is given a high permanence value; a small café is given a low permanence rating because of the likelihood it will close within one year.

The geographic researcher may also identify and record a feature extent rating for the feature indicating the length of the feature. In one embodiment, a value of 1 is assigned for feature extent length less than 25 meters, a value of 2 is assigned for feature extent length between 25 and 50 meters, a value of 3 is assigned for feature extent length between 50 and 75 meters, and a value of 4 is assigned for feature extent length greater than 75 meters. For example, a large Cathedral is given a feature extent value of 4 because its extent exceeds 75 meters; a small café is given a feature extent value of 1 because its extent is less that 25 meters.

The geographic research may also identify and record additional information that indicates the importance of the feature. For example, a uniqueness rating indicates generally how visually different or visually distinctive the feature is as compared to surround features. The uniqueness rating may be a value of 1 for no difference, value of 2 for some difference and a value of 3 for totally unique. For example, a thirty story sky scraper surrounded by single story buildings would have a value of 3. The uniqueness rating considers visually distinctive elements of the feature, such as the shape of the building, color of the building or building materials. For example, a yellow glass building among white brick buildings would have a value of 3.

At step 510, the geographic researcher computes a calculated importance value indicating a rating of the importance of the feature for route guidance. A feature is important for route guidance because it is readily recognizable or readily visually distinguishable from its surroundings. FIG. 7 illustrates a table 700 showing one exemplary embodiment for computing the calculated importance value. The table includes columns for attributes 702, values 704, scores 706 and weights 708. The attributes of visibility 710, permanence 712, relative distance 714, feature extent 716, seasonal dependency 718 and preferred name 720 are included in the table. For the attribute of preferred name, a value of 1 indicates that there is no preferred name for the feature; a value of 2 indicates that a preferred name for the feature is available, such as pink square building. The table 700 includes a score for each of the values of each attribute. For example, a score of 2 is provided for the visibility value of 1 clearly visible.

Referring to FIG. 7, the table 700 also includes weights 708 for each attribute. In this exemplary embodiment, the weights all have a value of 1; however, these weights may have different values in other embodiments. For example, there may be different weight values for different end users, such as trucks, passenger cars, motorcycles, bicycles, pedestrians, males, females, tourists and local residents. The calculated importance value is computed as the sum of the product of the score and weight of each attribute. For the exemplary embodiment, the calculated importance value will be a number less than or equal to ten. For example, the Cathedral has a visibility value of 1 with score 2 and weight 1; a permanence value of 3 with score 2 and weight 1; a relative distance value of 1 with score 1 and weight 1; a feature extent value of 4 with score 3 and weight 1; a seasonal dependence value of 1 with score 0 and weight 1; and a preferred name value of 2 with score 2 and weight 1 providing a calculated importance value of 10 (2*1+2*1+1*1+3*1+0*1+2*1=10).

In one embodiment, a single calculated importance value is determined. In another embodiment, multiple calculated importance values are determined for the feature for different lighting conditions, different weather conditions, different traffic conditions and different end users.

At step 512, the guidance feature point object information, association information, importance attribute information and calculated importance are stored in the geographic database. The geographic database is stored on a computer readable medium.

IV. Geographic Database with Guidance Feature Points and Association Data

The guidance feature point objects, association data, importance attributes and calculated importance information collected as described above is included in the geographic database 116 that represents some of the physical geographic features in the geographic region 202. In the exemplary embodiment of FIG. 3, the geographic database 116 that represents the geographic region 202 contains at least one guidance feature point database record 314 for each guidance feature point object identified in the geographic region 202. The geographic database 116 also includes association data records 316 to provide associations between the guidance feature point objects, attributes of the guidance feature point objects and other database records.

Figure 8:
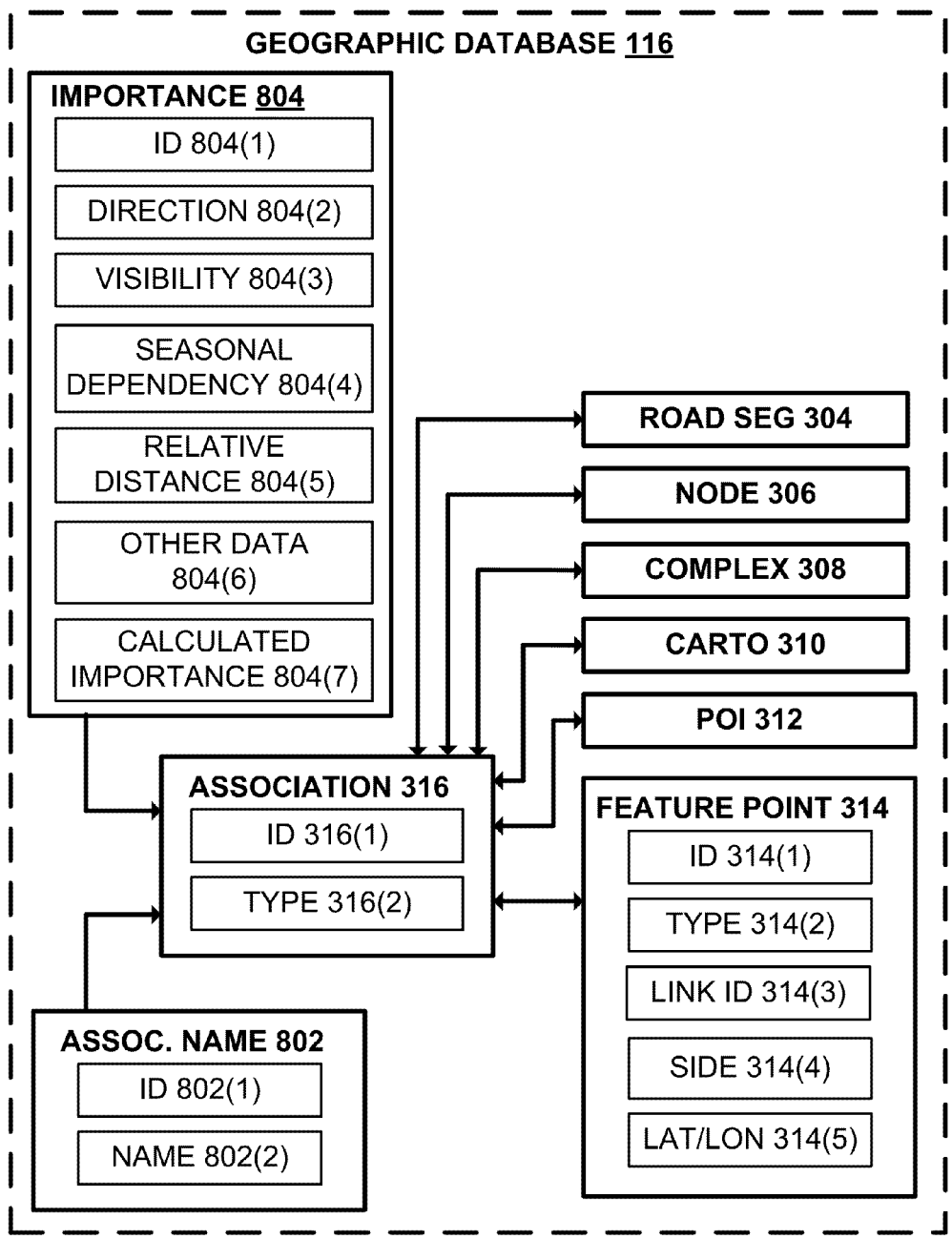
FIG. 8 is a block diagram of components of data records contained in the geographic database.

FIG. 8 shows some of the components of a guidance feature point database record 314 and an association database record 316 contained in the geographic database 116. The guidance feature point database record 314 includes a guidance feature point ID 314(1) by which the data record can be identified in the geographic database 116. Each guidance feature point database record 314 has associated with it information (such as "attributes", "fields", etc.) that describes features of the guidance feature point object. The guidance feature point database record 314 may include data 314(2) that indicate a type of guidance feature point object, such as a type used for natural guidance that provides contextual environmental information.

The guidance feature point data record 314 includes data 314(3) that indicate the road segment ID on or at which the guidance feature point object is located. The guidance feature point object data record 314 includes data indicating a side 314(4) of the road segment that the guidance feature point object is located. The data indicating a side 314(4) provides that the feature is to the left or right side relative to a reference node of the road segment. Additionally, side data 314(4) may indicate neither side for when the feature is equally visible on both sides of the road segment. The guidance feature point data record 314 further includes location data 314(5) indicating the longitude and latitude (and altitude) of the guidance feature point object.

The association database records 316 provide a feature association model that defines an association or relationship between two or more database records selected from road segment database records 304, node database records 306, complex feature database records 308, cartographic feature database records 310, point of interest database records 312 and guidance feature point object database records 314. The association members for the context of natural guidance include a road segment associated with a guidance feature point object, a point of interest associated with a road segment and a guidance feature point object, a cartographic feature associated with a road segment and a guidance feature point object, a complex feature associated with a road segment and a guidance feature point object, and a node associated with a road segment and a guidance feature point object.

Each association database record 316 includes an ID 316(1) by which the data record can be identified in the geographic database 116. The association database record 316 includes data 316(2) that indicate a type of association, either for passing guidance or for junction guidance. The feature association for passing guidance associates a guidance feature point object and a road segment to support route guidance when driving on the road segment and passing the visible feature corresponding to the guidance feature object point. The feature association for junction guidance associates a guidance feature point object and a road segment to support route guidance when driving or turning over a junction or complex intersection. In the context of one maneuver over a junction or complex intersection, the feature associations are defined for the road segment that is connected to the junction or complex intersection prior to the specific maneuver over the junction or complex intersection.

Although not shown in FIG. 8, the association data 316 may further include data that links the association data record 316 to the road segment database record 304 by identifying the respective association ID 316(1) and road segment ID 304(1), links the association data record 316 to the node data record 306 by identifying the respective association ID 316 (1) and node ID 306(1), links the association data record 316 to the cartographic feature database record 310 by identifying the respective association ID 316(1) and an ID of cartographic feature, links the association data record 316 to the complex feature database record 398 by identifying the respective association ID 316(1) and an ID of the complex feature, links the association data record 316 to the point of interest database record 312 by identifying the respective association ID 316(1) and ID of the point of interest, and links the association data record 316 to the guidance feature point data record 314 by identifying the respective association ID 316(1) and guidance feature point object ID 314(1).

As shown in FIG. 8, the association data also includes attribute information of associated name data 802. The associated name data 802 includes an ID 802 (1) by which the name data record 802 can be identified in the geographic database 116. The associated name database record 802 includes data 802(2) that indicate a preferred name when explicating the associated feature during guidance. The preferred name describes a visible characteristic or a visually distinguishing aspect of the feature, such as the color of the feature, shape of the feature, age of the feature, building materials of the feature, style of the feature, architectural description, decorative features, other visual properties including luster and sheen (shiny or dull) of the feature, motion or perceived motion of a portion of the feature, and/or any visible attribute that distinguishes the feature from other features in the surrounding area. For example, the special name may be pink building, red building, dome-shaped building, short-fat building, glass building, brick building, gothic architecture building, windowless building, tall building, neon sign of a bird attached to building, fountain in front of building, sculpture in front of building, and so on. In one embodiment, the preferred name may be a locally know name or nickname for the feature, such as "Max Brothers Petrol Shop." Alternatively, the preferred name is a base name, such as gas station, or a brand name. In one embodiment, more than one preferred name may be included in data 802(2), such as different preferred names for different end users (male, female, tourist and local resident).

Referring to FIG. 8, the association data also includes associated importance data record 804. The associated importance data record 804 contains several attributes useful for determining whether to use the associated feature when providing a guidance message. A feature is important for route guidance because it is readily recognizable or readily visually distinguishable from its surroundings. The associated importance data 804 includes an ID 804(1) by which the data record can be identified in the geographic database 116. The associated importance database record 804 includes data 804(2) that indicate an applied direction of the association. The direction is specified as a positive direction from a reference node to a non-reference node, negative direction from the non-reference node to the reference node or both directions.

The associated importance database record 804 includes data 804(3) that indicate a visibility of the feature from the direction of the associated road segment. The visibility may indicate clearly visible, partially visible or not visible and provide values rating the level of visibility or the level of visual obstruction. The visibility data 804(3) also includes data that indicate affects on visibility due to lighting conditions, weather conditions, traffic conditions and type of end user.

The associated importance database record 804 includes data 804(4) that indicate the seasonal dependency of whether (yes or no) the importance of the feature is impacted during a season or during a specific period of time. The seasonal dependence attribute can be used to determine the relevance of a feature for route guidance related to the season of the year or to a certain time of the year. In one embodiment, the seasonal dependency data 804(4) indicates a specific time period that the visibility of the feature is impacted, such as winter.

The associated importance database record 804 includes data 804(5) that provide a relative distance attribute that indicates the perceived distance between the feature and the guidance location. The relative distance provides a prominence of the feature, such as how prominent the feature is its surroundings. The relative distance attribute indicates whether the feature is close or distant, and it is an interpreted value that depends on the local situation, visibility and size of the feature. For example, a Cathedral located 100 meters from the road segment is considered to be close while a small café located 25 meter from the road segment is considered to be distant.

The associated importance database record 804 may include other data 804(6). Other data include a permanence rating for the feature indicating whether the appearance or visibility of the feature will change or is constant, a feature extent rating for the feature indicating the length of the feature, a preferred name for the feature and a uniqueness rating for the feature indicating how different or distinctive the feature is from surrounding features. In an exemplary embodiment, values for the importance attributes correspond to the values described about in conjunction with FIG. 7.

The associated importance database record 804 also includes calculated importance data 804(7). The calculated importance data 804(7) is a rating on the scale of 0 to 10 of the importance of the feature for route guidance, the higher the rating the more relevant the feature is for route guidance. The calculated importance can be used to determine the relevance of a feature for route guidance. A feature is important for route guidance because it is readily recognizable or readily visually distinguishable from its surroundings. When a maneuver has multiple features available to reference, the feature with the highest calculated importance is selected. The calculated importance may be computed using the visibility 804(3), seasonal dependency 804(4), relative distance 804(5), availability of a preferred name 802(2) as well as other attribute such as described above in conjunction with FIG. 5. In an exemplary embodiment, the values, scores and weights for the calculated importance correspond to those described about in conjunction with FIG. 7. In one embodiment, the calculated importance data is a single value. In another embodiment, the calculated importance data represents multiple calculated importance values for different lighting conditions, different weather conditions, different traffic conditions and different end users.

V. Route Calculation and Route Guidance

As discussed above in conjunction with FIG. 1, the navigation system 100 includes navigation application software programs 110 that provide the various navigation features and functions. In one embodiment, the navigation functions and features may include route calculation 124. The route calculation function 124 receives a request to calculate a route to a desired destination. The request may be in the form of an identification of a starting location and a desired destination location. The identification of these locations may include the geographic coordinates of these locations. The route calculation function may also be provided with other data or parameters, such as route preferences. Given at least the identification of the starting location and the destination location, the route calculation function 124 determines one or more solution routes between the starting location and the destination location. A solution route is formed of a series of connected road segment over which the end user can travel from the starting location to the destination location.

When the route calculation function 124 calculates a route, it accesses the geographic database 116 and obtains the road segment data records 304 and/or other data. The route calculation function 124 may use various means or algorithms in determining solution routes. Methods for route calculation are disclosed in U.S. Pat. No. 6,192,314, the entire disclosure of which is incorporated by reference herein. (The methods disclosed in the aforementioned patent represent only some of the ways that routes can be calculated and the claimed subject matter herein is not limited to any particular method of route calculation. Any suitable route calculation method now known or developed in the future may be employed.)

The route calculation function 124 provides an output. In one embodiment, the output of the route calculation function 124 is in the form of an ordered list identifying a plurality of road segments, such as the road segment IDs 304(1) (i.e., seg1, seg2, seg3, ... , seg(E), seg(F)) from the geographic database 116. The plurality of road segment IDs 304(1) represents the road segments that form the continuous navigable route between the origin and the destination that had been calculated by the route calculation function 124. (The route calculation function 124 may calculate more than one solution route.)

The route guidance function 126 uses the output of the route calculation function 124 to generate detailed directions or guidance messages for following the calculated route. In an exemplary embodiment, the route guidance function 126 evaluates each of the road segments that comprise the calculated route and prepares passing guidance messages and junction guidance messages. Passing guidance messages provide directions and environmental cues when driving the road segment and passing a visible feature. Junction guidance messages provide maneuver directions and environmental cues when driving or turning over a junction or complex intersection. The guidance messages may be prepared before the route is traveled or during travel of the route. The passing guidance message and junction guidance message may be provided for each component road segment of the route or only for a subset thereof. The guidance messages are generally required at decision points along the route that require a maneuver.

Figure 9A:
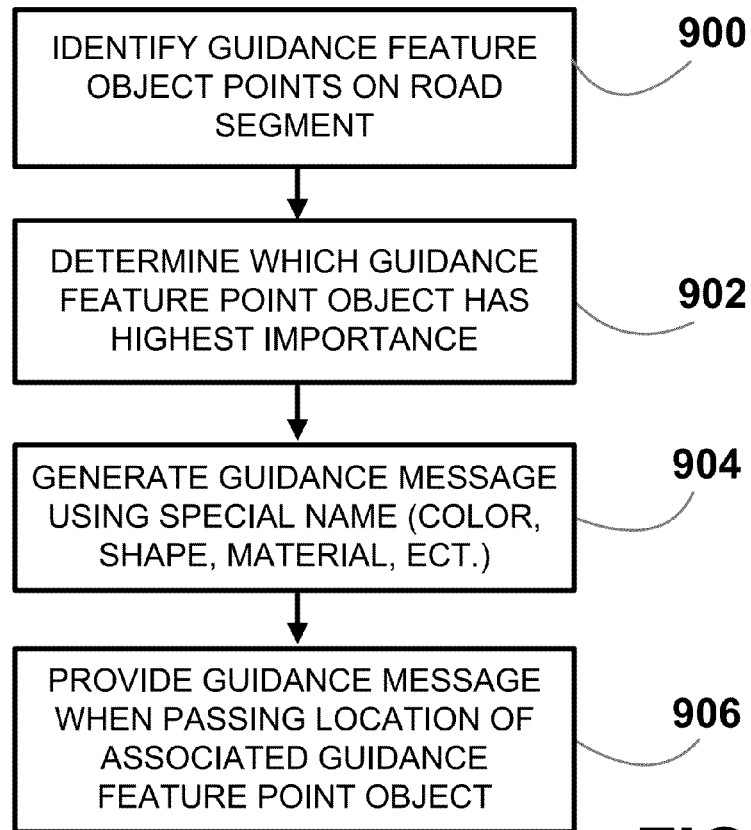
FIG. 9a is a flow chart for providing a passing guidance message.
Figure 9B:
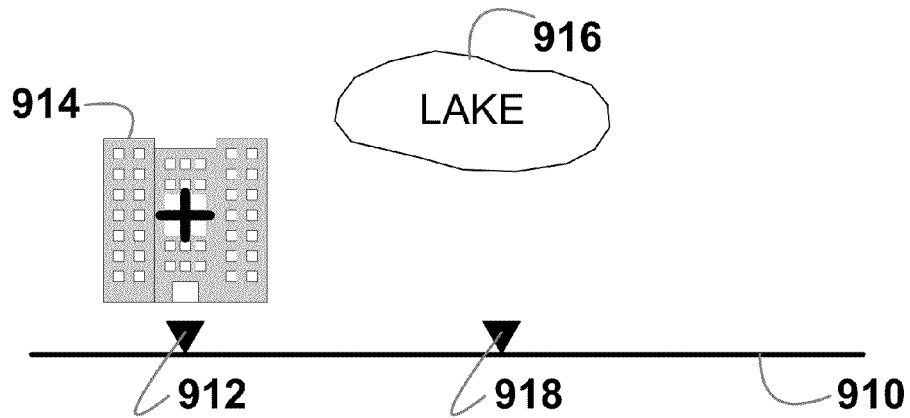
FIG. 9b is a representation of a portion of the geographic region.

FIG. 9a illustrates a flow chart of the steps for providing passing guidance for one of the road segments of the calculated route. At step 900, the guidance function 126 identifies all guidance feature point objects associated with the road segment. In the exemplary embodiment, the guidance function 126 identifies the guidance feature point objects associated with the road segments using the association data 316 of the geographic database 116 that provides the guidance feature point objects located on the road for passing guidance. FIG. 9b illustrates a road segment 910 that has two guidance feature point objects located on the road segment 910. A guidance feature point object 912 is associated with a hospital building 914 and a guidance feature point object 918 is associated with a lake 916.

At step 902 of FIG. 9a, the guidance function 126 determines which one of the guidance feature point objects located at the road segment has the highest associated importance. A feature is important for route guidance because it is readily recognizable or readily visually distinguishable from its surroundings. In one embodiment, the guidance function 126 obtains the calculated importance value 804(7) from the geographic database 116 for each of the guidance feature point objects located at the road segment. For example, the hospital 914 has a calculated importance value of eight while the lake 916 has a calculated importance value of six. Accordingly, the hospital 914 has the highest calculated importance value, so the hospital 914 will be used when generating the passing guidance message rather than the lake 916.

In another embodiment, the guidance function 126 obtains and evaluates the importance attributes 804 for each of the guidance feature point objects located at the road segment. The importance attributes include visibility 804(3), seasonal dependency 804(4), relative distance 804(5) and other data 804(6), such as a permanence rating for the feature indicating whether the appearance or visibility of the feature will change or is constant, a feature extent rating for the feature indicating the length of the feature, a preferred name exists for the feature, and an uniqueness rating indicates how visually different or distinctive the feature is compared to surrounding features. The guidance function 126 calculates an importance rating or value for each of the features associated with the guidance feature point objects located at the road segment using some or all of the importance attributes. The calculation may be similar to that described above in conjunction with FIG. 7 or a different calculation. Additionally, the scores for each attribute and weights for each may be different than described in conjunction with FIG. 7. For example, the scores and weights may be modified based on the type of end user, such as a truck that provides a higher point of view or a pedestrian that moves at slow speed, female/male end user, or tourist or local resident. Moreover, the scores and weights may be modified based on current lighting conditions, current weather conditions and current traffic conditions. In one embodiment, the navigation system obtains real time traffic and weather data.

At step 904, the guidance function 126 generates a guidance message using the preferred name of the feature associated with the highest importance guidance feature object point. For the example shown in FIG. 9b, the hospital 914 (and its guidance feature point object 912) was found to have the highest importance rating, so the guidance message will reference the hospital 914. In the exemplary embodiment, the guidance function 126 obtains the name 802(2) from the geographic database 116. For example, the hospital 914 has a preferred name of "tall blue glass building" that identifies its glass building material and greater height compared to the surrounding buildings. In other embodiments, the preferred name may be the words that describe visible characteristics or visually distinguishing element of the feature, such as the color, shape, age, building material, size, architectural style, decorative feature, luster, motion and/or any visible attribute that distinguishes the feature from other features in the surrounding area. For example, the special name may be pink building, red building, dome-shaped building, glass building, brick building, gothic architecture building, windowless building, tall building, neon sign of a bird attached to building, fountain in front of building, sculpture in front of building, and so on. In another embodiment, the preferred name may be a locally know name or nickname for the feature, such as "south-side hospital." In one embodiment, the guidance function 126 chooses from more than one available preferred name based on characteristics of the end user, such as a preferred name for a female end user.

For the road segment 910 shown in FIG. 9b, the guidance message is "follow the road passing the tall blue glass building on your left." At step 906, this passing guidance message is provided via the user interface 114 of the navigation system 100 when passing the location of the associated guidance feature point object 912 for the hospital 914. The guidance message may be provided on the display associated with the user interface 114 or as an audio message from a speaker associated with the user interface 114

Figure 10:
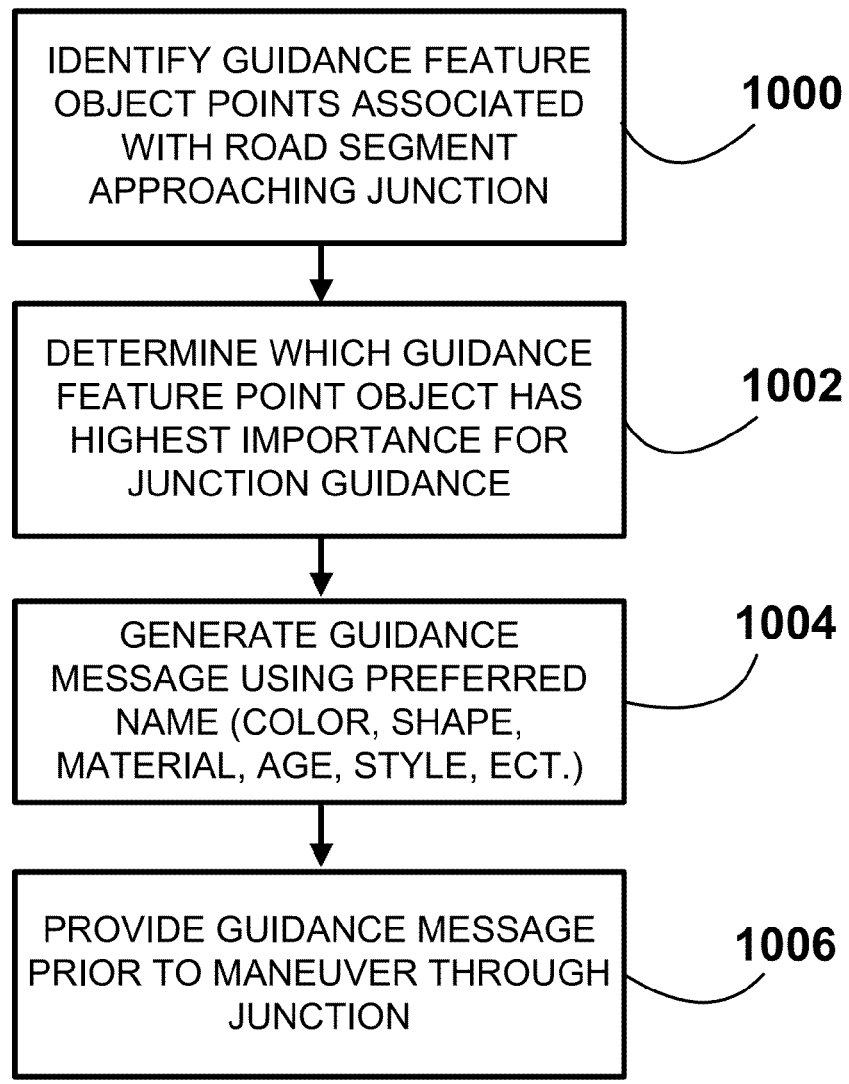
FIG. 10 is a flow chart for providing a junction guidance message.

FIG. 10 illustrates a flow chart of the steps for providing junction guidance for transition from one of the road segment to another road segment of the calculated route at a junction or complex intersection. At step 1000, the guidance function 126 identifies all guidance feature point objects associated with the road segment prior to the junction or complex intersection. In the exemplary embodiment, the guidance function 126 identifies the guidance feature point objects associated with the road segment using the association data 316 of the geographic database 116.

Figure 11:
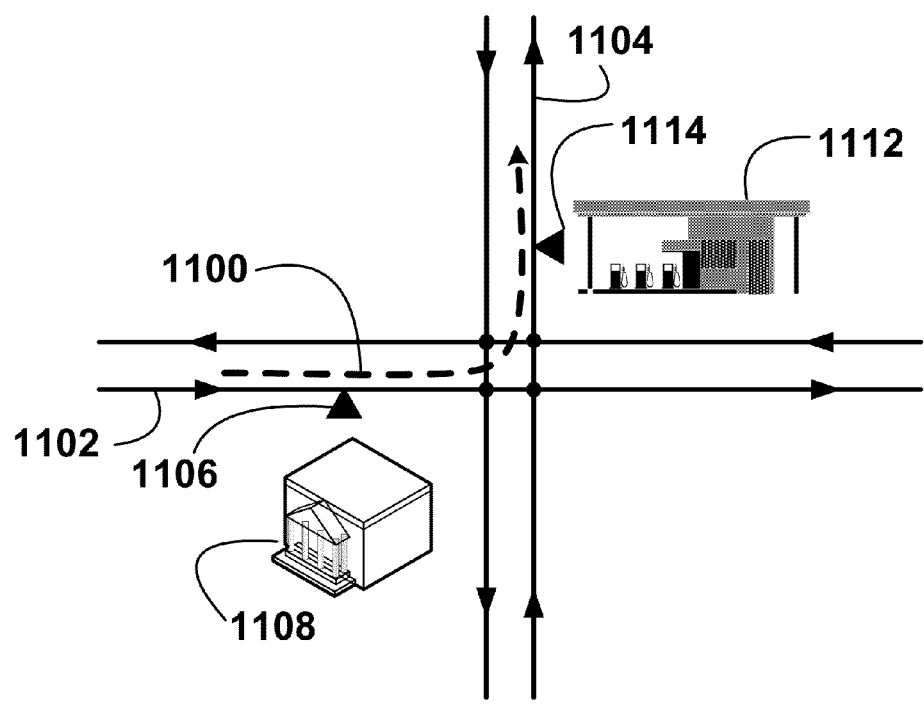
FIG. 11 is a representation of a portion of the geographic region.

FIG. 11 illustrates a route 1100 that travels through road segment 1102 and requires a left turn maneuver onto road segment 1104. The road segment 1102 has two associated guidance feature point objects. A guidance feature point object 1106 is associated with a courthouse 1108 and a guidance feature point object 1110 is associated with a gas station 1112 both are visible from the road segment 1102.

At step 1002 of FIG. 10, the guidance function 126 determines which one of the guidance feature point objects associated with the road segment 1102 has the highest importance. In one embodiment, the guidance function 126 obtains the calculated importance value 804(7) from the geographic database 116 for each of the guidance feature point objects 1106 and 1110 associated with the road segment 1102. For example, the courthouse 1108 has a calculated importance value of seven while the lake gas station 1112 has a calculated importance value of five. Accordingly, the courthouse 1108 has the highest calculated importance value, so the courthouse 1108 will be used when generating the junction guidance message rather than the gas station. In another embodiment, the guidance function 126 obtains and evaluates the importance attributes 804 for each of the guidance feature point objects 1106 and 1110 associated with the road segment 1102 in the manner similar to that describe above for passing guidance.

At step 1004, the guidance function 126 generates a guidance message using the preferred name of the feature associated with the highest importance guidance feature point object. For the example shown in FIG. 11, the courthouse 1108 (and its guidance feature point object 1106) was found to have the highest importance rating, so the guidance message will reference to the courthouse 1108. In the exemplary embodiment, the guidance function 126 obtains the name 802(2) from the geographic database 116. For example, the courthouse 1108 has a preferred name of "grand old, white marble building" that identifies its color, building material, style and age compared to the surrounding buildings. In another embodiment, the preferred name may be a locally know name for the feature, such as "old jail."

For the road segment 1102 shown in FIG. 11, the guidance message is "turn left directly after the grand old, white marble building." At step 1006, this junction guidance message is provided via the user interface 114 of the navigation system 100 prior to the location of the required maneuver. For the illustrative case, the message is provided when passing the location of the associated guidance feature point object 1106 for the courthouse 1108 prior to the intersection.

In another embodiment, the guidance function 126 may consider referencing traffic signal and stop signs when providing junction guidance messages. The traffic signals and/or stop signs are also features visible from the road segment prior to a maneuver. In one embodiment, the geographic database 116 includes data representing the traffic signal and stops sign located at the junction visible from the road segment, as well as a calculated importance value for referencing the traffic signal (and/or stop sign). Similar to the calculated importance value described above, the calculated importance value for the traffic signal (and/or stop sign) is a value from 0 to 10 with 0 representing low importance and 10 representing high importance for guidance. The database may further include importance indicator attributes of type of signal (timed, turn arrow, traffic light, stop sign), placement of signal (left side, right side, overhead) and urban/rural general location (urban stop signs are less visible than rural stop signs). The importance indicator attributes of the traffic signal (and/or stop sign) may also be used to determine the visibility and relevance of traffic signal (and/or stop sign). When the guidance function 126 determines which one of the guidance feature point objects associated with the road segment has the highest importance, the guidance function also obtains or computes the calculated importance value for the traffic signal (and/or stop sign). For the example of FIG. 11, if the traffic signal at the intersection has a calculated importance value greater than that of the courthouse, the guidance message would be "turn left at the traffic lights."

Figure 12:
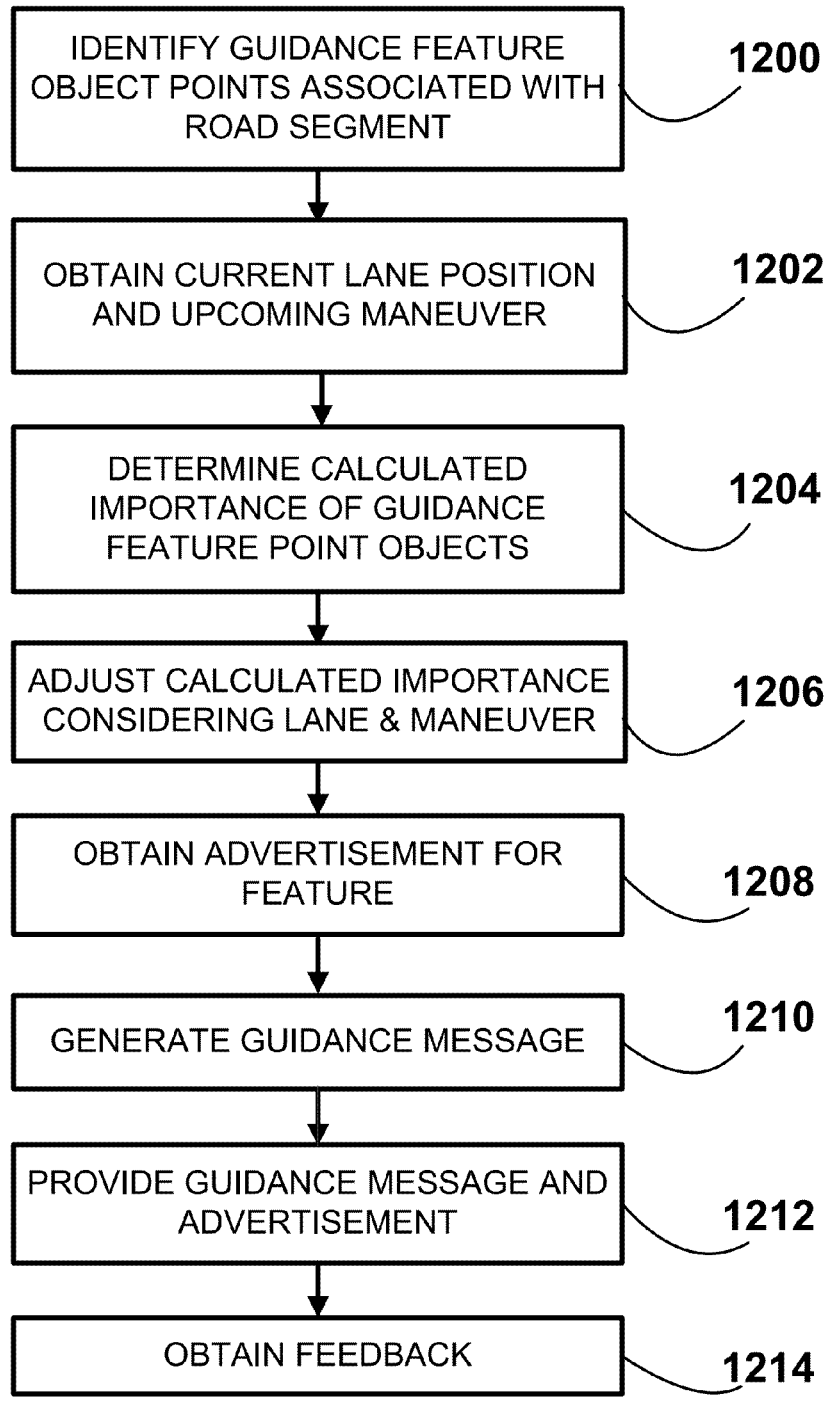
FIG. 12 is a flow chart for providing a guidance message.

FIG. 12 illustrates a flow chart of the steps for providing junction guidance for a multi-lane road segment and providing feedback regarding the guidance. At step 1200, the guidance function 126 identifies all guidance feature point objects associated with the road segment prior to the junction or complex intersection. In the exemplary embodiment, the guidance function 126 identifies the guidance feature point objects associated with the road segment using the association data 316 of the geographic database 116.

Figure 13:
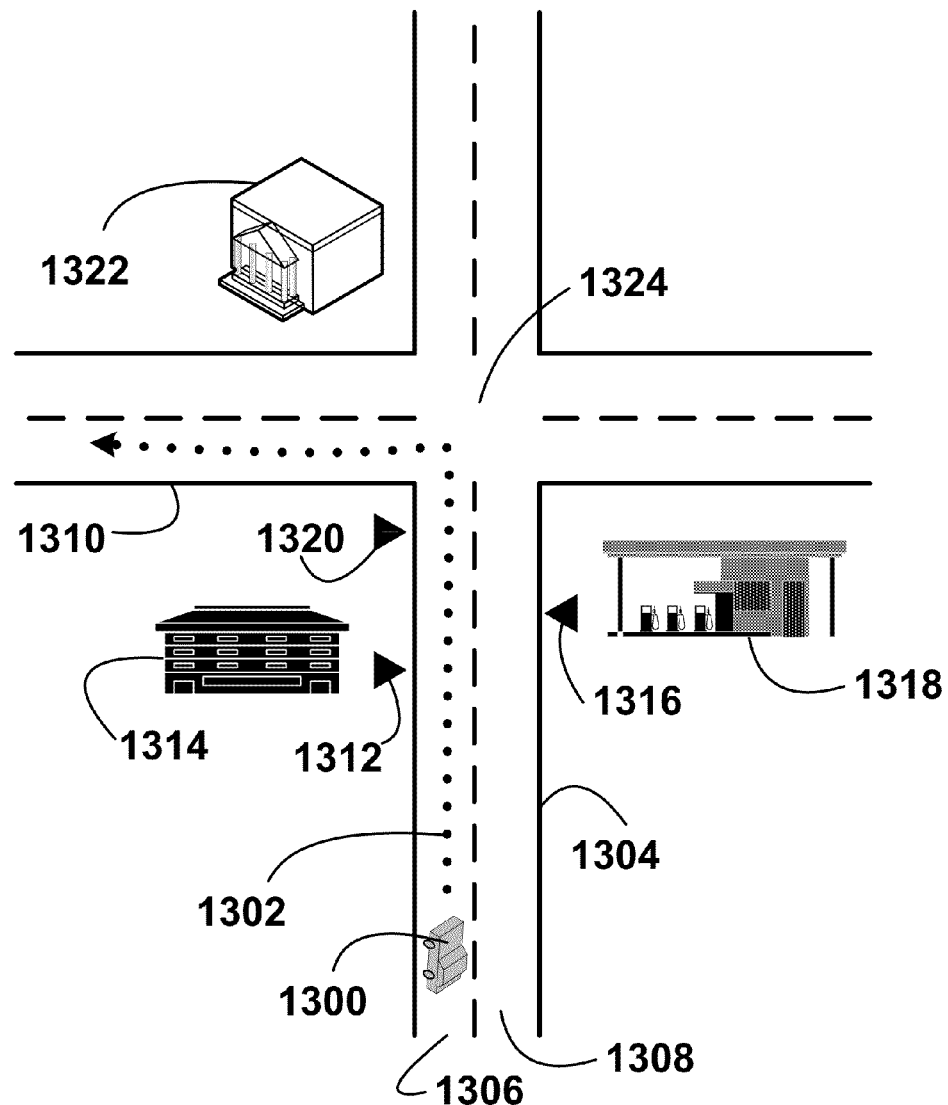
FIG. 13 is a representation of a portion of the geographic region.

FIG. 13 illustrates a vehicle 1300 traveling on a route 1302 that passes along road segment 1304 that includes a left lane 1306 and a right lane 1308. The route 1302 requires a left turn maneuver onto road segment 1310. The road segment 1304 has three associated guidance feature point objects. A guidance feature point object 1312 is associated with a restaurant 1314, a guidance feature point object 1316 is associated with a gas station 1318 and a guidance feature point object 1320 is associated with a bank 1322 all of which are visible from the road segment 1304.

At step 1202 of FIG. 10, the guidance function 126 obtains information representing which lane the vehicle is located as well as information representing the direction of the upcoming maneuver. In one embodiment, the guidance function 126 obtains that the vehicle is located in the left lane 1306 from the positioning function 130. The positioning system 130 uses information from the positioning system 112 as well as data representing lanes of the road segment from the geographic database 116. The guidance function 126 obtains the left turn direction of the upcoming maneuver from the route information.

At step 1204, the guidance function 126 determines the calculated importance for each of the guidance feature point objects associated with the road segment 1304. In one embodiment, the guidance function 126 obtains the calculated importance value 804(7) from the geographic database 116 for each of the guidance feature point objects 1312, 1316 and 1320 associated with the road segment 1304. For example, the restaurant 1314 has a calculated importance value of five, the gas station 1318 has a calculated importance value of six, and the bank 1322 has a calculated importance value of three. Alternatively, the guidance function 126 may compute the calculated importance using attributes from the geographic database 116.

At step 1206, the guidance function 126 adjusts the calculated importance values of the guidance feature point objects 1312, 1316 and 1320 considering the lane position and the upcoming maneuver. The guidance function 126 uses weights that favor guidance feature object points located on the same side of the road as the current lane position. For example, the current lane position for the vehicle 1300 in FIG. 13 is the left lane 1306 and the driver of the vehicle has more direct view to the restaurant 1314 on the left side of the road than the gas station 1318 on the right side of the road because other vehicles traveling in the right lane 1308 may obscure the gas station 1318 from the driver. Accordingly, the guidance function applies weights to the calculated importance to favor the restaurant 1314 over the gas station 1318. The values of the weights may be reduced if the road segment includes lanes of traffic to the left side of the left lane 1306 possibly obscuring the view of the restaurant 1314.

Additionally, the guidance function 126 uses weights that favor guidance feature object points located on the same side of the road as the maneuver. For example, the maneuver for the route 1302 is a left turn requiring the vehicle 1300 be located in the left lane 1306. The driver of the vehicle has more direct view to the restaurant 1314 on the left side of the road than the gas station 1318 on the right side of the road. Accordingly, the guidance function applies weights to the calculated importance to favor the restaurant 1314 over the gas station 1318. The values of the weights may be reduced if the road segment includes lanes of traffic to the left side of the left lane 1306 possibly obscuring the view of the restaurant 1314.

Furthermore, the guidance function 126 uses weights that favor guidance feature object points located prior to the intersection 1324 because it is advantageous for the driver of the vehicle 1300 to observe the feature prior to the upcoming maneuver giving the driver time to prepare for the maneuver. For example, the driver of the vehicle 1300 views the restaurant 1314 and the gas station 1318 prior to the intersection 1324, while viewing the bank 1322 after the intersection

1324. Accordingly, the guidance function applies weights to the calculated importance to favor the restaurant 1314 and the gas station 1318 over the bank 1322. Moreover, the guidance function 126 uses weighs to favor guidance feature object points located well in advance to the upcoming maneuver because it is advantageous for the driver of the vehicle 1300 to observe the feature prior to the upcoming maneuver giving the driver time to prepare for the maneuver. For example, the driver of the vehicle 1300 views the restaurant 1314 well before the necessary maneuver, while viewing the gas station 1318 and the bank 1322 closer to the maneuver. Accordingly, the guidance function applies weights to the calculated importance to favor the restaurant 1314 over the gas station 1318 and the bank 1322.

Moreover, the guidance function 126 adjusts the calculated importance values of the guidance feature point objects considering other situational factors, including current weather, current traffic conditions, current lighting conditions and so on. For example, if the driver is operating the vehicle 1300 during high traffic volume, the guidance feature object point that requires the driver to see over another lane of traffic will have its calculated importance adjusted lower. In one embodiment, the calculated importance values may be adjusted based on historic traffic conditions, such as considering time of day and/or day of the week when traffic is high and many delivery trucks may be present on the roads. Additionally, those features located farther away from the road segment may have their calculated importance values reduced during times of low light and poor visibility due to weather conditions, such as rain, snow and fog.

At step 1208, the guidance function 126 obtains an advertising message for the feature associated with the highest importance guidance feature point object. In one embodiment, the guidance function obtains the advertising message from the geographic database 116 that includes advertising messages for some of the points of interest. In another embodiment, the navigation system receives broadcasted advertising messages for some of the points of interest and stores them in an advertising database. The guidance function 126 obtains the advertising message from the advertising database. In a further embodiment, the guidance function obtains the advertising message from a navigation services server or an advertising server remote from the navigation system 100.

For the example of FIG. 13, the guidance function 126 obtains an advertisement for the restaurant 1314, such as "stop at the pancake house for some delicious maple syrup covered pancakes and receive a 10% discount." In one embodiment, if the guidance function determines that no advertisement exists for the feature associated with the highest importance guidance feature point object, the guidance function obtains an advertisement for the feature associated with one of the other guidance feature point objects. For example, if no advertisement exists for the restaurant 1314, the guidance function obtains an advertisement for the gas station 1318 or bank 1322.

Furthermore, in one embodiment the guidance function 126 adjusts the calculated importance values of the guidance feature point objects 1312, 1316 and 1320 considering whether an advertisement exists for the various guidance feature point objects. The guidance function 126 uses weights that favor guidance feature object points of features that have advertisements. For example, an advertisement exists for the bank 1322, but no advertisements exist for the restaurant 124 and gas station 1318. Accordingly, the guidance function applies weights to the calculated importance to favor the bank 1314 over the restaurant 1314 and the gas station 1318.

At step 1210, the guidance function 126 generates a guidance message using the preferred name of the feature associated with the highest importance guidance feature point object. For the example shown in FIG. 13, the restaurant 1314 (and its guidance feature point object 1312) was found to have the highest importance rating, so the guidance message will reference to the restaurant 1314. In the exemplary embodiment, the guidance function 126 obtains the name 802(2) from the geographic database 116. For example, the restaurant 1314 has a preferred name of "red pancake house" that identifies its color as compared to the surrounding buildings. For the road segment 1304 shown in FIG. 13, the guidance message is "turn left after the red pancake house." The guidance message may also include the advertisement, such as "turn left after the red pancake house, but why not stop at the pancake house for some delicious maple syrup covered pancakes and receive a 10% discount."

At step 1212, this junction guidance message and/or advertisement is provided via the user interface 114 of the navigation system 100 prior to the location of the required maneuver. For the illustrative case, the message is provided when passing the location of the associated guidance feature point object 1312 for the restaurant 1314 prior to the intersection 1324. The guidance message is provided in advance of the intersection 1324 to allow the driver of the vehicle 1300 to prepare for the upcoming maneuver.

At step 1214, feedback regarding the guidance message is obtained. In one embodiment, the guidance function 126 obtains data from the positioning system 130 indicating that the left turn was missed and the vehicle 1300 is no longer following the route 1302. The guidance function 126 creates a log storing data representing the guidance feature point object used in the guidance message as well as an indication of the maneuver that was missed. This log is then provided to the geographic researcher who analyzes the data to update and improve the data representing the guidance feature point object of the geographic database 116. Using the information from the log, the geographic researcher then lowers the calculated importance value, lowers the visibility rating, modifies the prominence value, modifies the preferred name of the feature, and/or modifies the seasonality of the feature. Additionally, the geographic researcher may review imagery or LIDAR data of the location of the guidance feature point object to determine whether the preferred name, prominence, visibility, seasonal dependency, lighting affects, weather affects, type of end user affects, traffic affects or other attributes should be modified.

In another embodiment, feedback regarding natural guidance is obtained from drivers or passengers of vehicles. The navigation system may include a reporting feature or button that allows the driver or passenger to report an error in the natural guidance or suggest an improvement for natural guidance. The reporting feature may record the location, time of day, date, weather, current traffic conditions, guidance message and/or suggestions by the user, and the reporting feature sends this information to the geographic database creator. One such reporting feature is disclosed in U.S. Pat. No. 6,253,151, the entire disclosure of which is incorporated by reference herein. For example, the reporting feature allows the driver to indicate that the feature in the guidance message was not visible. In a further embodiment, the driver may use an on-line reporting system to report errors or suggest improvements for natural guidance. One such reporting feature is disclosed in U.S. Pat. No. 6,718,258, the entire disclosure of which is incorporated by reference herein.

In another embodiment, the natural guidance messages and features visible along the route may be provided in a route simulation. The route simulation provides imagery or video of those features referred to in the guidance messages along with the guidance messages. The simulation allows the driver to familiarize himself or herself with the features along the route as well as the required maneuvers.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A computer implemented method of operating a navigation system to provide a route guidance message for a vehicle traveling a route comprising at least one road segment, the method comprising:
    obtaining data from a geographic database associated with the navigation system identifying a plurality of features visible from the road segment;
    identifying a direction of the vehicle and a current lane of the road segment in which the vehicle is currently located from among a plurality of lanes for traffic in the direction of the vehicle;
    determining, using a processor, an importance rating for each of the identified features, wherein the importance rating considers a visual uniqueness rating for each of the identified features, wherein the visual uniqueness rating indicates how visually distinctive the identified feature is compared to surrounding features and considers a permanence of the identified feature or a seasonal dependency of the identified feature, wherein the permanence of the identified feature indicates whether a visible appearance of the identified feature is constant, wherein the seasonal dependency of the identified feature indicates whether the visible appearance of the identified feature is impacted by a season;
    adjusting the importance rating for each of the identified features to obtain an adjusted rating to favor the identified feature closest to the current lane in which the vehicle is currently located; and
    providing the guidance message referencing the identified feature having a highest adjusted rating.

2. The method of claim 1 wherein the step of determining the importance rating further considers a visibility attribute of the identified feature, wherein said visibility attribute indicates a level of visibility obstruction of the identified feature.

3. The method of claim 1 wherein the step of determining the importance rating further considers a relative distance attribute of the identified feature, wherein said relative distance attribute indicates a prominence of the identified feature considering both a size of the identified feature and a distance of the identified feature from the road segment.

4. The method of claim 1 wherein the step of determining the importance rating further considers a feature extent attribute of the identified feature, wherein said feature extent attribute indicates a length of the identified feature.

5. The method of claim 1 wherein the importance rating is adjusted considering a current traffic condition, a current weather condition, a current lighting condition or a type of end user.

6. The method of claim 1 wherein the importance rating is obtained from the geographic database.

7. The method of claim 1 wherein the guidance message is provided via an user interface of the navigation system.

8. A navigation system comprising:
    a processor;
    a geographic database associated with the processor; and
    a guidance application program executed on the processor to provide a guidance message for traveling a route comprising at least one road segment, wherein the guidance application program obtains data from the geographic database identifying a plurality of features visible from the road segment, determines a direction of an upcoming maneuver and a current lane of a vehicle from a plurality of lanes for traffic in the direction of the upcoming maneuver, determines an importance rating for each of the identified features and provides the guidance message referencing the identified feature having a highest determined importance rating, wherein the importance rating favors the identified feature located on a same side of the road segment based on the direction of the upcoming maneuver and the current lane of the vehicle,
    wherein the importance rating includes a visual uniqueness rating for each of the identified features, wherein the visual uniqueness rating indicates how visually distinctive the identified feature is compared to surrounding features.

9. The navigation system of claim 8 wherein the importance rating considers at least one attribute of the identified feature selected from a group consisting of a permanence attribute representing whether a visible appearance of the identified feature is constant, a seasonal dependency attribute representing whether the visible appearance is impacted by a season, a visibility attribute representing a level of visibility obstruction, a prominence attribute representing a prominence of the identified feature considering both a size of the identified feature and a distance of the identified feature from the road segment, a feature extent attribute representing a length of the identified feature, and a preferred name attribute representing whether a name describing a visually distinguishing aspect of the identified feature is available from the geographic database.

10. The navigation system of claim 8 wherein the importance rating is adjusted based on a current traffic condition, a current weather condition, a current lighting condition or a type of end user.

11. The navigation system of claim 8 wherein the importance rating is obtained from the geographic database.

12. A computer implemented method of operating a navigation system to provide a guidance message, the method comprising:
    obtaining data from a geographic database associated with the navigation system to identify a plurality of features visible from a road segment;
    determining a direction of travel and a current lane of a vehicle from a plurality of lanes for traffic in the direction of travel;
    determining, using a processor, a visual uniqueness rating for each of the identified features, wherein the visual uniqueness rating indicates how visually distinctive the identified feature is compared to surrounding features and considers the current lane of the vehicle, wherein the visual uniqueness rating for each of the identified features considers a current lighting condition, a current traffic condition, a current type of end user or a current weather condition; and
    providing the guidance message referencing the identified feature having a greatest visual uniqueness rating.

13. The method of claim 12 wherein the step of determining the visual uniqueness rating considers a level of visibility obstruction of the identified feature.

14. The method of claim 12 wherein the step of determining the visual uniqueness rating considers both a size of the identified feature and a distance of the identified feature from the road segment.

15. The method of claim 12 wherein the step of determining the visual uniqueness rating considers a length of the identified feature.

16. The method of claim 12 wherein the step of determining the visual uniqueness rating considers whether a name describing a visually distinguishing aspect of the identified feature is available from the geographic database.

17. The method of claim 12 wherein the visual uniqueness rating is obtained as a value corresponding to the identified feature from the geographic database.

18. The method of claim 12 wherein the guidance message is provided when passing the identified feature.

19. The method of claim 12 wherein the guidance message is provided prior to an intersection.

* * * * *